(12) United States Patent
Heikenfeld et al.

(10) Patent No.: US 7,430,355 B2
(45) Date of Patent: Sep. 30, 2008

(54) LIGHT EMISSIVE SIGNAGE DEVICES BASED ON LIGHTWAVE COUPLING

(75) Inventors: Jason C. Heikenfeld, New Richmond, OH (US); Andrew J. Steckl, Cincinnati, OH (US); John D. Rudolph, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 147 days.

(21) Appl. No.: 11/535,801

(22) Filed: Sep. 27, 2006

(65) Prior Publication Data

US 2007/0031097 A1    Feb. 8, 2007

Related U.S. Application Data

(63) Continuation-in-part of application No. 10/730,332, filed on Dec. 8, 2003, now Pat. No. 7,123,796.

(51) Int. Cl.
*G02B 6/10* (2006.01)
*F21V 7/04* (2006.01)

(52) U.S. Cl. ............... 385/129; 385/27; 385/31; 385/33; 385/39; 385/130; 385/901; 362/84; 362/600; 362/601; 362/608; 362/609; 362/615; 362/629

(58) Field of Classification Search ............ 385/15, 385/27, 31, 33, 39, 129, 130, 901; 362/84, 362/600, 601, 608, 609, 610, 615, 629; 359/237, 359/298, 315, 319

See application file for complete search history.

(56) References Cited

U.S. PATENT DOCUMENTS

| | | | |
|---|---|---|---|
| 4,147,932 A | 4/1979 | Lewis | |
| 4,822,145 A | 4/1989 | Staelin | |
| 4,909,611 A | 3/1990 | Spooner | |
| 5,146,355 A | 9/1992 | Prince et al. | |
| 5,294,870 A | 3/1994 | Tang et al. | |
| 5,771,321 A | 6/1998 | Stern | |
| 5,898,185 A | 4/1999 | Bojarczuk, Jr. et al. | |
| 5,986,796 A | 11/1999 | Miles | |
| 5,994,722 A | 11/1999 | Averbeck et al. | |

(Continued)

FOREIGN PATENT DOCUMENTS

| | | |
|---|---|---|
| EP | 0272760 A1 | 6/1988 |
| EP | 1158332 A1 | 11/2001 |
| EP | 1220190 A2 | 7/2002 |
| EP | 1271457 A2 | 1/2003 |
| GB | 2404448 A | 2/2005 |
| JP | 2000214804 A | 8/2000 |
| WO | WO9731288 A2 | 8/1997 |
| WO | WO9819201 A | 5/1998 |
| WO | 9854930 A2 | 12/1998 |
| WO | 03071347 A1 | 8/2003 |

OTHER PUBLICATIONS

European Patent Office, International Search Report issued in corresponding European Patent Application No. 04817975.8 dated Feb. 6, 2007.

(Continued)

*Primary Examiner*—Frank G Font
*Assistant Examiner*—Michael P Mooney
(74) *Attorney, Agent, or Firm*—Wood, Herron & Evans LLP

(57) ABSTRACT

A signage device comprising one or more light sources, a waveguide or arrangement of waveguides and photoluminescent features coupled thereto. In one embodiment, a waveguide is adapted to receive light of a first wavelength and the photoluminescent features are adapted to emit light of a second wavelength in response to receiving light of the first wavelength.

49 Claims, 8 Drawing Sheets

U.S. PATENT DOCUMENTS

| | | |
|---|---|---|
| 6,208,791 B1 | 3/2001 | Bischel et al. |
| 6,288,829 B1 | 9/2001 | Kimura |
| 6,407,851 B1 | 6/2002 | Islam et al. |
| 6,470,115 B1 | 10/2002 | Yonekubo |
| 6,574,033 B1 | 6/2003 | Chui et al. |
| 6,589,625 B1 | 7/2003 | Kothari et al. |
| 6,635,306 B2 | 10/2003 | Steckl et al. |
| 6,642,913 B1 | 11/2003 | Kimura et al. |
| 6,819,845 B2 | 11/2004 | Lee et al. |
| 6,961,167 B2 | 11/2005 | Prins et al. |
| 6,967,763 B2 | 11/2005 | Fujii et al. |
| 7,123,796 B2 | 10/2006 | Steckl et al. |
| 2007/0053208 A1* | 3/2007 | Justel et al. ................. 362/629 |

OTHER PUBLICATIONS

Hayes, Robert A. et al., "Video-speed Electronic Paper Based on Electrowetting", Nature vol. 425, Sep. 25, 2003, pp. 383-385.

J.L. Jackel, S. Hackwood and G. Beni, Electrowetting Optical Switch, Appl. Phys. Lett. 40(1), Jan. 1, 1982 (3 pages).

Xiaohua Ma, and Geng-Sheng (G.S.) Kuo, Optical Switching Technology Comparison: Optical MEMS vs. Other Technologies, IEEE Optical Communications, Nov. 2003, pp. S16-S23.

M.G. Pollack, A.D. Shenderov and R.B. Fair, Electrowetting-based actuation of droplets for integrated microfuidics, Lap Chip Journal, 2002, 2, pp. 96-101.

* cited by examiner

LIGHT EMISSIVE SIGNAGE DEVICES BASED ON LIGHTWAVE COUPLING

CROSS REFERENCE TO RELATED APPLICATIONS

This application is continuation-in part of application Ser. No. 10/730,332, filed Dec. 8, 2003, the disclosure of which is hereby incorporated by reference herein in its entirety.

FIELD OF THE INVENTION

The invention relates to light emissive displays and, more specifically, to light emissive signage devices based upon lightwave coupling.

BACKGROUND OF THE INVENTION

Many technologies are currently being developed to provide the next generation of flat panel, projection, flexible, and micro-displays. Hat-panel emissive displays, which emit light in a lambertian behavior, are considered by consumers to be the most attractive display. Despite the human eye's natural affinity for emissive displays, liquid crystal displays (LCD) currently dominate the commercial display market. Because LCD's utilize light directing films and polarizers, a perceptible variance in image quality is observed with view angle. Furthermore, the vast majority (approximately 90 percent or greater) of light in an LCD never reaches the viewer because of unavoidable absorption in thin film polarizers and color filters, and other optical losses in the LCD. Generally, polarizers transmit only about 40 percent of unpolarized incident light and color filters transmit only about 20 percent to about 30 percent of incident white light.

Cold cathode fluorescent lamp (CCFL) backlights, which provide about 80 lm/W efficiency, generally result in an LCD efficiency of only a few lm/W. Furthermore, the LCD continuously absorbs light at a pixel regardless of whether the pixel is on (i.e., transmissive) or off (i.e., not transmissive). This insensitivity to pixel state leads to very poor panel efficiency for displaying images that utilize only a fraction of the overall number of LCD pixels. Alternative flat panel display technologies, such as inorganic electroluminescent, organic electroluminescent, plasma display panels, and field emission displays, do not require either efficiency-reducing polarizers or heavy color filtering. Regardless, even these alternative display technologies have comparable or lower efficiency to that of an LCD display panel.

The elimination of polarizers and color filters would significantly improve the efficiency of LCD's. Previous attempts to remove the polarizers from an LCD have included using focal conic domains to scatter light from a specular waveguide and replacing the inefficient liquid crystal cell with electromechanical light valves that involve a specular white light guides, diffuse light outcoupling, and heavy color filtering. Such conventional approaches provide only moderate, if any, efficiency improvements over conventional LCD's and suffer from significant inherent drawbacks, such as strong diffuse reflectivity of ambient light and poor contrast between pixel on and pixel off states.

Industrial signage is a segment of the information display marketplace that continues to advance and evolve with the development of a multitude of optical, electrical, mechanical, and chemical technologies. Light emitting diodes (LED's) have increased in performance (lumens/watt) to the point that they are replacing traditional neon and fluorescent tubes in both outdoor and indoor signage. Tiled liquid crystal and projection displays of various technologies, including cathode ray tubes, liquid-crystal light valves, and lasers, are being used to produce large venue displays which can be actively addressed and provide motion/video imaging in a thin, aesthetically pleasing package. While active or passively addressed motion-capable displays are highly desirable and in demand, they are too expensive for the majority of industrial signage applications. Furthermore, LED-based and neon signs cannot produce full-color imaging performance without some form of light modulation. Therefore, most cost-effective LED-based and neon signs are only capable of producing static line-art, albeit reasonably bright static line-art. Additionally, most of these bright static signs employ multiple optical diffusers that require significant air gaps between the light sources and the printed or stylized display material, typically acrylic sheets, or polyester or vinyl sheeting. The need for air gaps results in the need for deep and unwieldy light boxes.

Therefore, a cost efficient signage system capable of producing bright, full color imaging capability with motion-like simulation effects is desirable.

SUMMARY OF THE INVENTION

In accordance with an embodiment of the invention, a specular waveguide or lightguide propagating relatively short wavelength ultraviolet, violet, or blue light may be equipped with a coupling element capable of selectively coupling the short wavelength light to a photoluminescent medium adjacent the waveguide. Unlike conventional approaches, the background luminance arising from imperfections in such waveguides is extremely low, as the human eye perceives ultraviolet and violet light with a low brightness. Upon receiving the relatively short wavelength light, the photoluminescent medium fluoresces in visible red, green, blue, and mixed colors. Furthermore, the photoluminescent medium may be designed to emit light primarily and efficiently in the direction of the viewer only achieving greater than about 50 percent light outcoupling, which significantly exceeds conventional approaches that are generally limited to less than 15 percent light outcoupling. Devices in accordance with principles of the invention may be utilized as a planar two-dimensional (2D) or three-dimensional (3D) light source, patterned information signage, or a re-configurable information display containing intensity-modulated pixels. These devices may be adapted to provide contrast enhancement that supplies legibility in bright lighting environments without a large concomitant loss in emitted luminance.

The light emissive display may use a highly efficient lamp or light emitting diode (LED) and may omit either polarizers or color filtering of white light.

In accordance with an embodiment of the invention, a specular lightguide or waveguide, which terms are used synonymously in the specification, propagates short wavelength light confined to the waveguide via internal reflection. The short wavelength light is coupled to a photoluminescent medium by modifying the index of refraction at the interface between the waveguide and the photoluminescent layer such that short wavelength light is optically transmitted or refracted into the photoluminescent medium. The index of refraction between the photoluminescent medium and waveguide is modulated by electrostatic, electro-optic, electro-wetting, or another suitably controllable actuation technique. The photoluminescent medium fluoresces and emits light isotropically consistent with spontaneous emission theory. Through optical refraction or reflection, fluorescent light is confined to the photoluminescent medium until it is emitted onto the viewer.

The light emissive display technology in one embodiment of the invention uses a highly efficient lamp or LED technology and requires no polarizers or color filtering of white light. Furthermore, a light emissive display is provided that is inherently lambertian or emissive in nature such that the pixels are efficient in outcoupling of emission to a viewer and are not strongly diffusely reflective. Furthermore, if a specular waveguide technique is used, the waveguide propagates light that is invisible (ultraviolet) or of low perceptible brightness (violet, blue) to the human eye, for the purpose of reducing the background luminance of such a type of display.

In another embodiment of the invention, the application of lightwave coupling technology to create signage devices involves an optical system comprised of one or more light sources providing light of a primary wavelength which by way one or more lightguides or waveguides excites red, green, blue, white, or other color photoluminescent inks attached to the waveguides.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
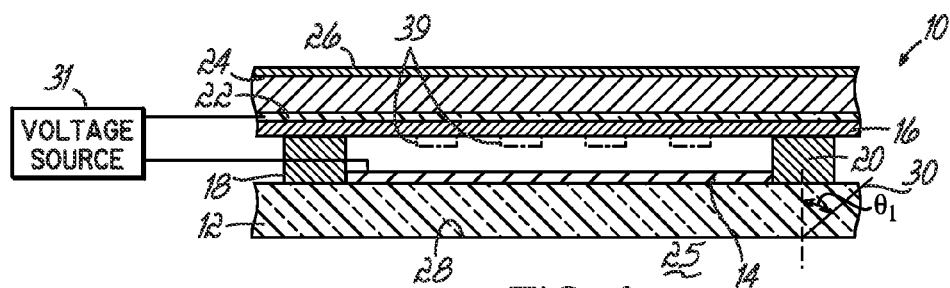
FIG. 1 is a cross-sectional view of an electro-statically modulated lightwave coupling device of an embodiment of the invention depicted in a non-emitting state.
Figure 3A:
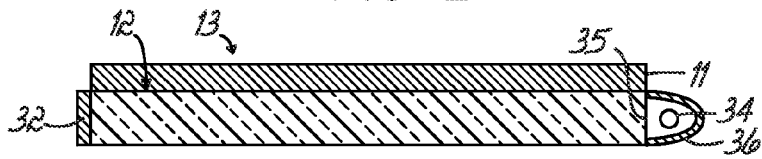
FIG. 3A is a cross-sectional view of a waveguide and a short wavelength light source in accordance with an embodiment of the invention.

Although the invention will be described next in connection with certain embodiments, the description of the invention is intended to cover all alternatives, modifications, and equivalent arrangements as may be included within the spirit and scope of the invention as defined by the appended claims. In particular, those skilled in the art will recognize that the components of the modulated lightwave coupling devices and displays described herein could be arranged in multiple different ways. With reference to FIG. 1, a lightwave coupling (LWC) device 10 comprises one of an array 11 of multiple substantially identical LWC devices 10 constituting a lightwave coupled (LWC) display 13 (FIG. 3A). The LWC devices 10 are coupled with a lightguide or waveguide 12, of which only a portion is shown in FIG. 1, that operates as a supporting substrate. Each of the LWC devices 10 includes a lower electrode 14, a flexible supporting layer or membrane 16 physically separated from the waveguide 12 by spacers 18, 20 when device 10 is in a non-emitting state, and an upper transparent electrode 22 covered by a photoluminescent medium or layer 24. Waveguide 12 is any optically transparent material capable of propagating ultra-violet, violet, or blue light and having a refractive index higher than the refractive index of an environment 25 surrounding the LWC device 10. A surrounding environment 25 of gas or vacuum has a refractive index of about 1.0 and a surrounding environment of a low index liquid, such as water or other optical fluids, typically have refractive indices of about 1.3 to about 1.4. Suitable materials for constructing waveguide 12 include, but are not limited to, silicon nitride (Si3N4), silicon oxynitride (SiON), borosilicate glass, aluminosilicate glass, float glass, and other optical glasses and polymers known by those skilled in the art of optics. Particularly suitable materials for waveguide 12 include organic polymethyl methacrylate (PMMA) and inorganic silicon dioxide (glass), each of which has a refractive index of about 1.5 at visible light wavelengths.

Because of the refractive index difference with the surrounding environment, light, diagrammatically indicated on FIG. 1 by reference numeral 30, can propagate indefinitely within the waveguide 12 as long as it propagates within an incident angle θ1 relative to internal surfaces 28 of waveguide 12 within the critical angle for internal reflection. The minimum incident angle, commonly called the critical angle, is calculated according to Snell's law of refraction (n1 sin θ1=n2 sin θ2) for the case of the transmitted angle θ2 equal to 90°:

$$\theta 1 = \operatorname{ArcSin}(n2/n1) \tag{1}$$

For example, if the waveguide 12 is composed of PMMA, the critical incident angle may be calculated to be 42° at one of the internal surfaces 28 if the surrounding environment 25 is either gas or vacuum (i.e., n2=1). Efficient internal reflection requires that the internal surfaces 28 be specular and substantially free of light scattering imperfections. Higher or lower refractive index waveguide materials will decrease or increase the critical angle, respectively.

The thickness of the waveguide 12 will affect the optical power density at any given point in waveguide 12. The thickness of waveguide 12 may be about 1 mm to about 10 mm thick for a rigid display and on the order of 0.01 mm to 2 mm thick for a flexible display. A flexible display further requires that all other films and substrates used in fabrication of the display device be inherently flexible, or suitably thin such that they become flexible. The invention contemplates that multiple LWC devices 10 are integrated in an addressable display incorporating multiple pixels arranged in an array.

References herein to terms such as "vertical", "horizontal", etc. are made by way of example, and not by way of limitation, to establish a frame of reference. The term "horizontal" as used herein is defined as a plane parallel to the conventional plane or surface of the waveguide associated with the display, regardless of orientation. The term "vertical" refers to a direction perpendicular to the horizontal, as just defined. Terms, such as "on", "above", "below", "side" (as in "sidewall"), "higher", "lower", "over", "beneath" and "under", are defined with respect to the horizontal plane. It is understood various other frames of reference may be employed without departing from the spirit and scope of the invention. As used herein, the term "lower layer(s)" refers to stationary components of the display, such as the waveguide, and the term "upper layer(s)" refers to portions of the LWC device that move relative to the lower layers when actuated.

With continued reference to FIG. 1, the lower electrode 14 may be reflective, transparent, or have patterned apertures allowing for partial transparency. A transparent lower electrode 14 may be an inherently optically-transparent and electrically-conductive material, or a layer comprising a non-transparent or partially transparent electrically-conductive material with patterned apertures, or open spaces, or extreme thinness in order to provide for adequate transparency, or a combination thereof. Suitable transparent lower electrodes 14 may have a thickness in a range of about 0.01 μm to about 1 μm, although the invention is not so limited. An inherently optically transparent lower electrode 14 ideally has a refractive index close to the refractive index of the waveguide 12 such that it also contributes to light propagation in the waveguide 12 by internal reflection. Suitable inherently transparent materials for lower electrode 14 include, but are not limited to, indium tin oxide (ITO or In2O3:SnO2), ZnO:Al, PEDT/PSS polymer, and polyanaline polymer. Non-transparent patterned materials for lower electrode 14 should be highly reflective to short wavelength light.

Suitable metals or semiconductors for the construction of lower electrode 14 when either thinned or patterned include, but are not limited to, aluminum (Al), silver (Ag), platinum (Pt), chromium (Cr), and any electrically-doped narrow band-gap semiconductor such as silicon (Si) or germanium (Ge). Because narrow band-gap semiconductors are light absorbing, the lower electrode 14 may further include a reflective element (not shown) between the waveguide 12 and lower electrode 14. The lower electrode 14 may be a composite structure of an inherently transparent electrode layer, such as ITO, and a non-transparent reflective metal electrode layer, such as Al, in order to provide both high transparency, supplied by ITO, and high electrical conductivity, supplied by Al.

With continued reference to FIG. 1, the flexible membrane 16 is suspended above the waveguide 12 and, as described above, physically separated from the waveguide 12 by spacers 18, 20. The peripheral edges of the flexible membrane 16 are captured between the spacers 18, 20 and the upper electrode 22 such that the peripheral edges are stationary as the LWC device 10 is cycled between on and off states. In certain embodiments, the separation distance is within the range, but not limited to, about 0.01 μm to about 100 μm. In other embodiments, the separation distance is in the range of about 1 μm to 10 μm. A suitable thickness for flexible membrane 16 is within the range, but not limited to, about 0.01 μm to about 100 μm. The flexible membrane 16 is constructed of any flexible membrane material that tolerates flexing without loss of elasticity or resultant physical degradation. In certain embodiments, the flexible membrane 16 should be able to withstand multiple flexing that, for a 20,000 hr display lifetime operated at 60 Hz, requires as much as several billion actuations without experiencing mechanical failure. In an alternate embodiment, the flexible membrane 16 may be omitted from the LWC device 10 if the photoluminescent layer 24 and/or upper electrode layer 22 provide suitable flexibility.

The flexible membrane 16 may be composed of a highly resilient and transparent material, or combination of materials, for which suitable materials include, but are not limited to, silicon oxide (SiO2), Si3N4, and combinations or compounds of these materials. Optically opaque materials, such as polysilicon and other semiconductors, and steel, inconel, and other metals, may also be used for the flexible membrane 16 but must be appropriately patterned such that the path of light between the waveguide 12 and photoluminescent layer 24 is not occluded or hindered. Polymers also exhibit flexibility and transparency and, hence, may be utilized for the construction of flexible membrane 16 as long as they are mechanically resilient.

The spacers 18, 20 should not absorb light from the waveguide 12 and therefore preferably have a lower reflective surface, alternatively are inherently reflective, or alternatively are transparent and consist of an upper reflective surface. If the spacers 18, 20 contact very little surface area of the waveguide they need not necessarily be highly reflective since very little of the waveguide light will be incident on and absorbed by the spacers 18, 20. Suitable materials for support spacer 18, 20 include, but are not limited to, polysilicon, $SiO_2$, or $Si_3N_4$ with Ag mirrored confronting surfaces, or titanium (Ti) or platinum (Pt) spacers. Suitable supporting dimensions for spacers 18, 20 include height of 0.1 to 100 μm and width and/or length of 0.1 to 1000 μm. Spacers 18, 20 can be formed in various geometries, include pillars, ridges, grids, and other geometries familiar to persons of ordinary skill in the art of micro-electromechanical actuators, such that they lend adequate support to the flexible membrane 16.

With continued reference to FIG. 1, the upper electrode 22, which may be composed of the same materials as lower electrode 14 and is transparent, is coextensive with an upper surface of the flexible membrane 16. The photoluminescent material of the photoluminescent layer 24 covering the upper electrode 22 fluoresces longer wavelength light, such as visible light, upon receipt of shorter wavelength, such as ultraviolet, violet, or blue light. The photoluminescent layer 24 is flexible, optically transparent, and about 0.01 μm to about 100 μm in thickness. The photoluminescent layer 24 may uniformly overlie the entire upper surface of the flexible membrane layer 16 or, preferably, overlie only a center portion of the flexible membrane 16 so that the edges of the flexible membrane 16 may flex freely near the spacers 18, 20 and to prevent unwanted pixel blooming. The photoluminescent layer 24 may also be patterned in island, lens, ridge, grating, textured, or other geometries for high light outcoupling efficiency known by those skilled in the art of emissive displays and optics.

Suitable materials forming for the photoluminescent layer 24 include perylene, coumarin, and other common fluorescent dyes, such as laser dyes, dispersed in a polymer host. Among the suitable materials are BASF Lumogen™ dyes dispersed in a polymethylmethacrylate (PMMA) matrix. Example dyes for red, green, and blue emission are Lumogen™ 300, Lumogen™ 083, and Lumogen™ 570, respectively. Suitable materials also include BASF Lumogen™ dyes in a high refractive index (n greater than about 1.5) polymer such as Brewer Science OptiNDEX A07. Suitable materials also include perylene, coumarin, or other commons laser dyes, doped into a polyvinylchloride (PVC) or polyvinyl butryal (PVB) matrix. Suitable materials also include dye or phosphor powder-doped materials such as DuPont TEFLON® AF fluoropolymer that has a refractive index of about 1.3.

In alternative embodiments, the photoluminescent layer 24 may comprise an inorganic powder phosphor including, but are not limited to, BaAlO:Eu for blue light emission, SrGaS: Eu for green light emission, and $Y_2O_3$:Eu for red emission, dispersed within an organic binder, such as PMMA. In other alternate embodiments, the photoluminescent layer 24 may comprise a semiconductor including but not limited to InGaN and ZnSeS, that strongly absorbs light of greater energy than the semiconductor band-gap and re-emits light of energy comparable to the semiconductor band-gap. The photoluminescent layer 24 may also consist of two or more mixed fluorescent materials that may result in mixed colors. Multiple fluorescent materials may be used in a fashion where a first fluorescent material most efficiently absorbs light from the waveguide, fluoresces a longer first wavelength of light, and a second fluorescent material most efficiently absorbs this first wavelength of light and then fluoresces a longer second wavelength of light. Regardless of the choice of fluorescent material, the material forming the photoluminescent layer 24 may be formed in sub-micron geometries, such as nanocrystals, or in photonic band-gap structures, which can increase the color purity of the light emitted from the photoluminescent layer 24.

With continued reference to FIG. 1, the upper and lower surfaces of the photoluminescent layer 24 may each be either specular or textured. In certain embodiments of the invention, a transparent scattering layer 26 may be provided on the upper surface of the photoluminescent layer 24. The scattering layer 26 may also be a partially diffuse portion of the photoluminescent layer 24 supplied by a non-planar surface having a root-mean-square (RMS) surface roughness in the range of about 0.1 μm to about 10 μm. Alternatively, the scattering layer 26 may be made diffuse by the presence of scattering centers. For the case of a scattering layer 26 formed of a PMMA-based (refractive index of about 1.5) matrix, one suitable scattering center would be a high refractive index zinc sulfide (ZnS), barium sulfide (BaS), or titanium dioxide ($TiO_2$) powder. The scattering layer 26 may also be formed by incorporation of gas bubbles within the photoluminescent layer 24. The photoluminescent layer 24 may optionally include a layer (not shown) on its upper and/or lower surface comprising a multi-layer step index film or an optical microcavity operative for enhancing both outcoupling efficiency and color purity of light from the photoluminescent layer 24. Example multi-layer microcavities may be formed from alternating $SiO_2/TiO_2$ layers, or other formulations known by those skilled in the art of displays and optics. Enhanced outcoupling of light from the photoluminescent layer 24 using an optical microcavity does result in the disadvantage of reduced viewing angle, and is of primary use in direct-view displays and projection style displays. In an alternate embodiment of the present invention the photoluminescent layer 24 may be positioned below, and contacting the lower surface of, the flexible membrane 16.

Figure 2:
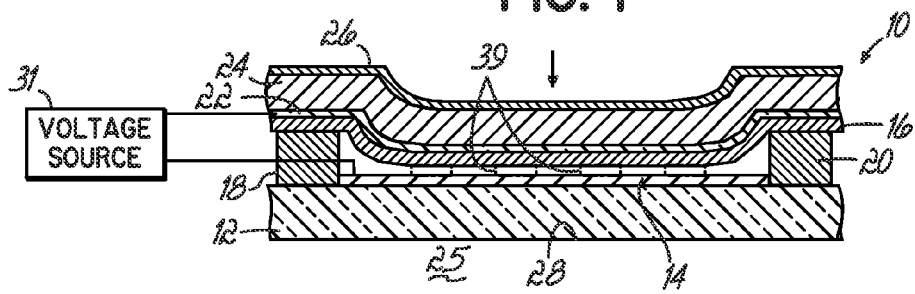
FIG. 2 is a cross-sectional view similar to FIG. 1 showing the electro-statically modulated lightwave coupling device in an emitting state.

With reference to FIGS. 1 and 2, the LWC device 10 may be electrostatically addressed between an on state (FIG. 2) resulting in emission and an off state (FIG. 1) with no concomitant emission by voltage applied between lower and upper electrodes 14, 22 from an electrically-coupled voltage source 31. In the off state, the spacing between the flexible membrane 16 and the lower transparent electrode 14 and waveguide 12 prevents transfer or coupling of short wavelength light from the waveguide 12 into the flexible membrane 16 and subsequently into the photoluminescent layer 24. In the on state, the spacing is reduced or nearly eliminated by electrostatic actuation resulting from an electric field applied between the lower and upper electrodes 14, 22 precipitating an electrostatic attraction therebetween so that short wavelength light is transferred from the waveguide 12 to the photoluminescent layer 24. Typically, a voltage differential of about 1 volt to about 100 volts between the electrodes 14, 22 suffices to precipitate electrostatic actuation. In certain embodiments, the voltage differential is on the order of about 3 volts to about 5 volts, which is compatible with standard complimentary metal-oxide-silicon (CMOS) display drive circuitry.

With reference to FIG. 2, the waveguide 12 and the flexible membrane 16 have a contacting or proximate relationship when the LWC device 10 is in the on state so that short wavelength light propagating within the waveguide 12 couples into the contacting portion of the flexible membrane 16 and subsequently into the upper electrode 22 and photoluminescent layer 24. The short wavelength light is absorbed by the photoluminescent layer 24, which then fluoresces visible light. The LWC device 10 may incorporate photoluminescent layers 24 that fluoresce red, green, blue, or combinations thereof including white light. The LWC devices 10 may be arranged in individual, segmented or arrayed form to create a re-configurable monochrome, multi-color, or full-color light emissive information display or indicator.

In the on state, the upper layers constituted by flexible membrane 16, upper electrode 22 and photoluminescent layer 24 may be separated by a small separation distance or gap from the lower layers (e.g., waveguide 12 and lower electrode 14) in the on state or, alternatively, the flexible membrane 16 may be in intimate contact with the lower electrode 14. If the lower electrode 14 and the flexible membrane 16 have a contacting relationship, light couples from the lower layers to the upper layers via optical transmission, or alternatively by optical refraction if the upper layers do not match the refractive index of the lower layers. Separating the flexible membrane 16 from the lower electrode 14 by a small gap of about 0.00001 μm to about 1 μm may improve the freedom of actuation of the upper layers in and out of contact with the lower layers. The gap may be determined by the surface roughness of the contacting surfaces of the flexible membrane 16 and lower electrode 14. The gap may, alternatively, be determined by non-planar features, such as ridges, short columns, or induced surface roughness, purposely introduced to the contacting surfaces of the flexible membrane 16 and lower electrode 14. If separated by a gap, the coupling of light from the lower layers to the upper layers is believed to be determined by frustrated internal reflection according to the mathematical relationship:

$$E(z)=Eoe-\alpha z, \alpha=2\pi no \lambda 0-1 (\sin 2 \theta i - \sin 2 \theta c)1/2 \qquad (2),$$

where E(z) is the evanescent amplitude of light at a surface normal distance z between flexible membrane 16 and lower electrode 14.

By way of a specific illustrative example, the coefficient for penetration depth, α, is determined to be 5.6 μm for a waveguide refractive index no=1.5, short wavelength light of wavelength λ0=0.4 μm, incident angle of θi=45°, and the sine of the critical angle of 1/1.5 according to equation (1). Therefore, the gap may be approximated to be 0.12 μm or 0.02 μm for 50 percent or 90 percent coupling, respectively. In alternative embodiments, an index matching fluid or other type of fluid or gel, such as silicone oil, may reside on the contacting surfaces of flexible membrane 16 and lower electrode 14, which provides a non-permanent but intimate contact between contacting layers, thus allowing as high as greater than about 99 percent coupling. The effect of frustrated internal reflection also allows for coupling of light from the waveguide 12 to the photoluminescent layer 24 in instances for which the photoluminescent layer 24 has a lower refractive index than the waveguide 12. For this case, light from the waveguide 12 only partially penetrates the photoluminescent layer 24, the penetrating light either being absorbed by the fluorescing material in the photoluminescent layer 24 or being internally reflected back into the waveguide 12.

The gap between flexible membrane 16 and lower electrode 14 in the off state should be adequately large to achieve a significant contrast ratio between the on and off states. Consistent with the predictions of equation (2), the gap between lower and upper layers should be 0.82 μm or 1.11 μm for a contrast ratio of 100:1 or 500:1, respectively. Suitable separation distances may be much greater than 1 μm and as much as 100 μm or greater.

With reference to FIGS. 1 and 2, the LWC device 10 transitions from the on state (FIG. 2) to the off state (FIG. 1) when the applied voltage differential to the electrodes 14, 22 is reduced to a level sufficient such that the flexible membrane 16 pulls itself out of contact or proximity, as is the case, with the lower electrode 14, as the upper electrode 22 moves simultaneously with the upper electrode 22, due to the action of a restoring force. The flexible membrane 16 may incorporate a residual restoring force due to a built-in constant tensile strain, or other form of strain, or due to an inherent mechanical force that opposes the electrostatic force applied between the electrodes 14, 22 and that must exceed the inherent electrostatic attraction force between the flexible membrane 16 and the lower electrode 14. The inherent restoring force provided by the constant tensile strain operates to return the flexible membrane 16 to its original un-actuated state. Alternatively, the LWC device 10 may incorporate a third electrode for pulling the membrane 16 out of contact with or proximity to, as appropriate, with waveguide 12.

A suitable actuation area for LWC device 10 is about 100 μm2 to about 106 μm2 and is determined by the strengths of the restoring, applied electrostatic, and inherent electrostatic forces according to design theory well known by those skilled in the art of electrostatic membranes. For large LWC devices 10 having an actuation area exceeding about 105 μm2, the total device may be constituted by multiple sub-devices (e.g., one device with multiple separating spacers) having a configuration as depicted in FIGS. 1 and 2, thus allowing an increase in total device size without major change in separation distance, required applied electrostatic force, and inherent mechanical restoring force. The actuation area and/or contacting area can be but are not necessarily of equal size to the entire device area. Flexible electrostatic membrane operation is well known by those skilled in the art of microelectromechanical actuators and, according to the invention, may be configured in a variety of existing continuous or patterned membrane formats which allow for proper flexibility and restoring force in the membrane.

As described above, the volume or environment surrounding the LWC device 10 is filled with a gas, liquid, or vacuum, which allows for free movement of actuated upper layers. A preferable surrounding medium is argon (Ar) gas with a suitable pressure of about 1 mTorr to about 760 Torr and, in certain embodiments, a pressure of 1 to 100 Torr. Suitable liquid mediums can be chosen from index matching liquids and fluids well known by persons skilled in the art of optics, as long as the liquid medium has a lower refractive index than the waveguide 12 so that internal reflection of short wavelength light in the waveguide 12 is preserved.

With reference to FIGS. 1, 2 and 3A, a display 13 (FIG. 3A) would include an array of LWC devices 10 placed adjacent to a planar waveguide 12. Because the waveguide 12 is transparent and the photoluminescent layer 24 can emit light isotropically, the LWC devices 10 may be placed adjacent to either one or both sides of the waveguide 12. The shape of the waveguide 12 is limited only by the need to preserve internal reflection of light propagating in the waveguide 12. Waveguide 12 may have a planar shape or a non-planar shape, such as cylindrical. The waveguide 12 is provided with a reflector 32 on surfaces not satisfying the criterion for internal reflection. Some of such surfaces may not include a reflector 32, examples being surfaces or edge facets 35 where short wavelength light is injected into the waveguide 12 from a short wavelength light source 34, which may emit short wavelength light in a range of about 350 nm to about 450 nm. Suitable short wavelength light sources 34 include InGaN light emitting diodes, cold-cathode-lamps, or cold-cathode fluorescent lamps. Other ultra-violet, violet, blue, or even green or red, light sources are possible and are chosen from light sources known by those skilled in the art of lighting and illumination.

The choice of wavelength for the short wavelength light source 34 is a compromise between optical transparency and reflectance of materials which both decrease with decreasing wavelength of light, and increasing quantum efficiency of photoluminescent materials with decreasing wavelength and reduced background luminance of the waveguide 12 with decreasing wavelength of light. The light source 34 may comprise a coherent source, such as a laser, that may easily be aligned with most waveguide geometries for efficient injection of short wavelength light.

Most incoherent light sources 34 emit light isotropically and require assistance in coupling light into the waveguide 12. For example and as shown in FIG. 3A, a parabolic or elliptical mirror 36 may be used to efficiently inject the light from these non-coherent light sources into the waveguide 12. A parabolic mirror 36 decreases the angle incidence for light injection into the waveguide 12 and therefore also decreases Fresnel back-reflection of light at the adjacent surface of the waveguide 12. This decrease in back reflection is due to the theoretical decrease in Fresnel refection with decreasing angle of incidence. Optical lenses (not shown) may be used to improve the efficiency of light injection from the light source 34 into the waveguide. Some optical sources such as InGaN light emitting diodes are readily available in forward and side emitting lensed packages, which are well suited for injecting light into the waveguide 12.

Light traverses within the planar waveguide 12 until it is absorbed by the waveguide 12 itself, scattered at defects that may exist in waveguide 12, absorbed or scattered by layers contacting the waveguide 12, or lost due to imperfect reflection by the reflector 32. Waveguide materials such as silica glass and PMMA have a very low loss coefficient of 0.2 dB/m or 0.1 dB/m, respectively, for short wavelength light at or around 0.4 μm wavelength. Preferable mirror materials include metals such as Ag, or multilayer dielectric mirrors comprised of ZnS, TiO2, SiO2, Ag, and other materials well known by those skilled in the art. Multi-layer dielectric mirrors such as 3M VikuitiTM ESR film may also be used.

An additional short wavelength light sources (not shown but similar to light source 34) may be positioned on the opposing end of the waveguide 12 for increasing the coupling efficiency to the LWC devices 10 (FIG. 1) without causing significant luminance non-uniformity. In other alternative embodiments, multiple short wavelength light sources 34 may be positioned at various end locations of the three-dimensional waveguide 12.

Figure 3B:
FIG. 3B is a cross-sectional view of a waveguide and short wavelength light source in accordance with an alternative embodiment of the invention.

With reference to FIG. 3B in which like reference numerals refer to like features in FIG. 3A, a planar waveguide 12a incorporates a diffuse reflector 38 used to inject the short wavelength light from the short wavelength light source 34. The diffuse reflector 38 provides a redistributive reflection of light. The length and width of waveguide 12a in the x-y direction of a Cartesian coordinate system is defined by a horizontal plane into and out of the plane of the page and the thickness of the waveguide 12a in the z (vertical) direction is normal to the plane. Reflector 38 allows light, regardless of the critical angle of waveguide 12a, to reflect back into the waveguide 12a within the critical angle, while additionally allowing a redistribution of the direction of the light traveling in the waveguide 12a. This redistribution in turn would improve luminance uniformity in the LWC display 13. In one embodiment, reflector 38 may include redistributive reflecting ridges or features oriented only in selected spatial directions. Alternatively, an efficient diffuse reflector 38 that redistributes light may also be suitable to reflect light back into the waveguide 12a as long as it is not in intimate optical contact with the waveguide 12a. According to equation (1), for the case of a waveguide refractive index of 1.5, light incident at any angle on an edge facet 40 of the planar waveguide 12a will satisfy the critical angle for propagation within the waveguide 12a. Similarly, reflector 32 (FIGS. 3A, 3B) may also be configured as a redistributive diffuse reflector similar to reflector 38.

The short wavelength source 34 may be embedded in an extruded extension 42 of the waveguide 12a, which increases the light extraction efficiency from the short wavelength source. Furthermore, by embedding the short wavelength light source 34 in the extruded extension 42 surrounded by the diffuse reflector 38, light injected into and not satisfying the critical angle requirement within the extruded portion of the waveguide 12a is reflected by the diffuse reflector 38 and, therefore, recycled until it satisfies the critical angle requirement. Diffuse injection and reflection of short wavelength light into the waveguide 12a redistributes light traveling at large angles of incidence within the waveguide 12a to propagation angles that are more efficiently coupled with the LWC devices 10. By way of example, if the waveguide refractive index is equal to 1.5, the edge injection or reflection of light from the waveguide end facet 40 at a maximum angle of incidence of $\theta I=90°$ will result in a maximum angle of incidence during propagation in the waveguide of 48°. This is 6° larger than the critical angle, which reduces unwanted outcoupling of short wavelength light arising from refraction at surface irregularities or sharp bends in a flexible LWC display 13 (FIG. 3A).

A suitable diffuse reflectance material for diffuse reflector 38 is barium sulfide (BaS) powder combined with an organic binding matrix and applied to a mirrored surface of diffuse reflector 38, which will provide greater than about 99 percent diffuse reflection. Alternative techniques for supplementing injection of short-wavelength light into the waveguide 12a include injection of light from a source or additional waveguide containing another light source (not shown but similar to light source 34), which is optically coupled to and mounted on any surface of the waveguide 12a. It is further appreciated that additional light sources 34 may be embedded in the waveguide 12a.

To increase the propagation efficiency of short wavelength light in the waveguides 12 or 12a, the emission intensity can be made very uniform across the entire LWC display 13 even when a single short wavelength light source 34 is disposed to only one end of the waveguide 12 or 12a. This, however, requires that if the majority of the display area is populated by lightwave coupled devices 10 that are in the on state, each individual LWC device 10 itself should receive by coupling only a small fraction of the light as the light propagates past the lightwave coupled devices 10. For a 0.3 m×0.3 m PMMA waveguide 12, propagating short wavelength light will undergo 1.5 percent (e.g., 0.06 dB) absorption loss for each traverse across the panel, 2 percent (e.g., 0.09 dB) loss at the reflector 32 and appropriate on of mirrors 36, 38, and 25 percent (e.g., 1.25 dB) loss as it is coupled to the LWC devices 10 in the on state. With this model, it will take six (6) traverses before the propagation light attenuates by a total of 85 percent, resulting in a display luminance uniformity of greater than about 90 percent. 25 percent (e.g. 1.25 dB) loss due to coupling of light from the waveguide per traverse requires reduced coupling efficiency for the LWC devices. With renewed interest in FIG. 2, in order to decrease the LWC device coupling efficiency, the effective coupling area may be decreased between the flexible membrane 16 and the lower electrode 14. This can be achieved by adding couplers 39, shown in phantom in FIG. 1, to the surface of the flexible membrane 16 or, alternatively, by roughening the contacting surface of either the lower electrode 14 or the flexible membrane 16.

Figure 3C:
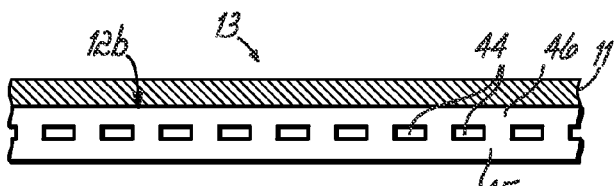
FIGS. 3C and 3D are enlarged cross-sectional views of central portions of waveguides in accordance with alternative embodiments of the invention.

With reference to FIG. 3C, a propagation distributing waveguide 12b, of which only a portion is shown in FIG. 3C, for LWC display 13 (FIGS. 3A, 3B) includes gas or vacuum gaps 44 created by adhesively bonding at least two planar waveguides 45, 46 with a patterned optical adhesive. Propagation distributing waveguide 12b may improve the luminance uniformity of the LWC display 13. Specifically, the propagation distributing waveguide 12b limits the maximum coupling efficiency of the LWC device 13 by partially confining light propagation to each of the optically bonded waveguides 44, 45, as the gaps 44 define regions without light transmission. The lightwave coupled devices 10 of LWC display 13 can then be designed for strong coupling such that LWC device coupling dominates in absorption of short wavelength light over non-desired reflective and transmission losses. It is appreciated that the waveguide 12b will include a reflector and light source (not shown) similar to reflector 32 and light source 34 (FIG. 3A). The patterned coupling defined by the gaps 44 can be spatially located in repetitive or non-repetitive arrangements and geometries to provide a desired display luminance uniformity.

Figure 3D:
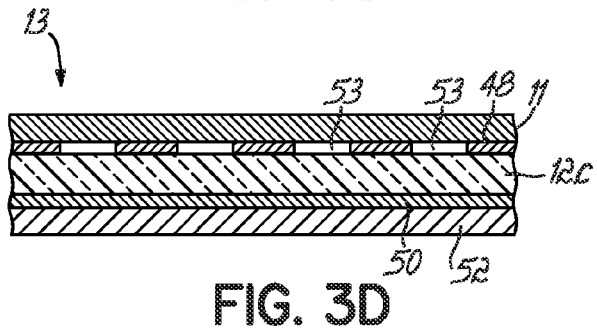

With reference to FIG. 3D, a waveguide 12c, of which only a portion is shown in FIG. 3D, includes upper and lower optical cladding layers 48, 50 that increase optical confinement of the propagating short wavelength light. The lower cladding layer 50 is effective for reducing or eliminating reflection losses over regions of contact between waveguide 12c and the rear packaging 52 of the display 13. The upper cladding layer 48 is effective for reducing or eliminating reflection losses over regions where the waveguide 12c is in contact with either of the spacers 18, 20, electrodes 14, or other LWC device layers. Apertures 53 defined in the upper cladding layer 48 allow short wavelength light to couple from the waveguide 12c to the LWC devices 10 (FIG. 1) constituting display 13. It is appreciated that the waveguide 12c will include a reflector and light source (not shown) similar to reflector 32 and light source 34 (FIG. 3A). Although illustrated in FIG. 3D as added to waveguide 12 (FIG. 3A), cladding layers 48, 50 may also be added to waveguides 12a, 12b, and 12c.

Suitable cladding layers 48, 50 for a waveguide 12c with refractive index of about 1.5 to 2.0 would be magnesium fluoride (MgF2), that has a refractive index of 1.4 at 0.4 μm and should have a thickness ranging from about 1 μm to about 2 μm according to equation (2). Other suitable cladding materials include, but are not limited to, inorganic lithium fluoride (LiF) and organic fluoropolymers such as DuPont TEFLON® AF. In an alternative embodiment, the cladding layers 48, 50 may be formed of a low density of micron-sized spacer materials dispersed in a low index liquid such as water, which has a refractive index of about 1.3, or in a gas sealed by an additional layer disposed greater than about 1 μm away from the waveguide 12 by the micron-sized spacer material. If material of the cladding layers 48, 50 have an index of 1.4 and the material constituting the waveguide 12c has an index of 1.5, waveguide edge injection of short wavelength light from gas or vacuum leads to a minimum injection angle of incidence of 54° resulting in a required match to the waveguide/cladding critical angle of 55°. In an alternative embodiment, waveguide 12 (FIG. 2) may be composed of a liquid such as silicone oil enclosed inside a transparent solid waveguide material or cladding, which therefore supplies the liquid medium waveguide its proper geometrical shape.

With continued reference to FIG. 3D, upper cladding layer 48 eliminates reflective loss at spacers 18, 20 and lower electrode 14 (FIG. 1) as long as cladding layer 48 is not strongly absorbing and suitably spaces the spacer 18, 20 or lower electrode 14 from the waveguide 12c. The use of cladding layer 48 further allows for much larger area for the spacer 18, 20 and electrode layer 14 without an increase in reflective loss. In this embodiment of the invention, suitable waveguide materials include, but are not limited to, SiON, which can be modified to have a refractive index of 1.5 to 2.0 by adjusting the O to N ratio, aluminosilicate glass such as Corning 1737, which has a refractive index just above 1.5, and Brewer Science OptiNDEX polymers, which can be blended with other polymers to reach a refractive index as high as 1.8.

Figure 4:
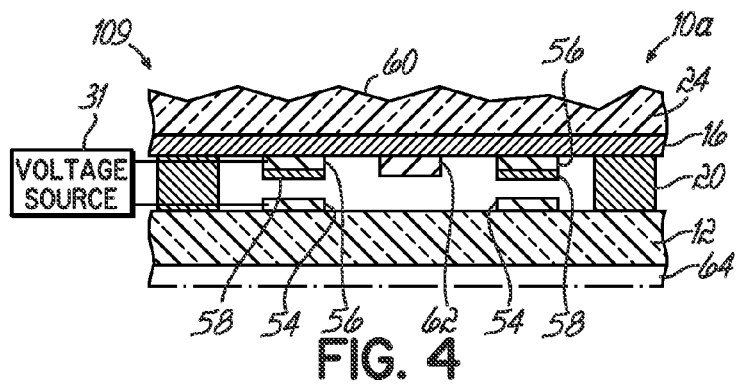
FIGS. 4-11 are cross-sectional views similar to FIG. 1 of modulated lightwave coupling devices in accordance with alternative embodiments of the invention.

With reference to FIG. 4 in which like reference numerals refer to like features in FIG. 1 and in accordance with an alternative embodiment of the invention, a LWC device 10a includes a patterned lower electrode 54 disposed on waveguide 12 and a patterned upper electrode 56 disposed on membrane 16. One or both of the electrodes 54, 56 may include a dielectric coating 58 present to prevent electrical shorting between electrodes 54, 56 for contacting or near contacting proximities. The dielectric coating 58 allows for electrostatic attraction without direct current flow between attracted electrodes 54, 56. Electrodes 54, 56 are electrically coupled with voltage source 31 for providing a first condition in which short wavelength light is transferred from the waveguide 12 to the photoluminescent layer 24 and a second condition in which short wavelength light remains confined in the waveguide 12.

The patterned electrode 54 should purposely encompass only a fractional area of the surface of waveguide 12 since most electrode materials, such as aluminum (Al) having a reflectivity of about 90 percent, significantly attenuate light. In certain embodiments of the invention in which patterned electrode is composed of Al, patterned electrode 54 may cover less than 10 percent of the surface area of waveguide 12. Using an exemplary waveguide 12 that is 0.3 mm long and 3 mm wide, a ray of short wavelength light traveling at 45° incidence will only incident upon the upper surface of the waveguide 12 adjacent to patterned electrode 54 every 6 mm. Therefore the resulting light attenuation during one traverse of the waveguide 12 would be 0.90 n where n is the number of times the light is incident on the upper waveguide surface. For the case of Al comprising 10 percent of the upper waveguide surface area, n=0.10×300 mm/6 mm=5 incidence events. The resulting attenuation is 0.905=0.59. It is evident that optical cladding layers 48, 50 (FIG. 3D) would significantly reduce light loss by enhancing the reflectivity of the waveguide 12c.

In an alternative embodiment, a patterned electrode 54 composed of Ag, which has greater than 97 percent reflectance at a wavelength of about 450 nm, may be used in combination with an InGaN short wavelength source 34 (FIG. 3A) injecting blue light at a similar wavelength. In yet another alternative embodiment, the patterned electrode 54 may be suspended by spacers above the waveguide 12 at a distance of about 1 μm, as determined by equation (2). In yet another alternative embodiment, patterned electrode 54 may be composed of a thin ITO layer. A 10 nm thickness of ITO absorbs only 0.5 percent of incident 0.4 μm light, provides about 100 Ω/square sheet resistance, and at 10 percent area coverage, will only attenuate short wavelength light by about 2.5 percent for one traverse across the waveguide 12. This attenuation may be combined with the 2 percent attenuation associated with an Al mirrored spacers 18, 20 (FIG. 1) which are about 2 μm×2 μm×1 μm (W×L×H) in dimension and comprise 0.4 percent of a 100 μm×100 μm wide LWC device 10*a*. For an instance of 50 percent usage of LWC devices 10*a* in the display 13 (FIG. 3A) and 25 percent coupling efficiency to the LWC devices 10*a*, this results in a short wavelength light utilization efficiency of about 60 percent. Using the same calculation used for reflective loss, the 25 percent coupling efficiency for one traverse across the display can be calculated to require a coupling area of 0.6 percent of the device area. For such a low coupling efficiency per LWC device 10*a*, the display 13 will become inefficient for a very low count of pixels on in the display. To increase the efficiency of the LWC display 13, either the pixel coupling efficiency may be increased and/or reflectivity losses may be decreased through use of cladding layers 48, 50 (FIG. 3D).

With continued reference to FIG. 4, an upper surface 60 of the photoluminescent layer 24 may be made partially diffuse to enhance forward outcoupling of fluorescent light emission to the viewer. The upper surface 60 may be made partially diffuse by either adding a distinct partially diffuse layer or by modifying the photoluminescent layer 24. Alternatively, either or both sides of the photoluminescent layer 24, or layers adjacent to either or both sides, may be partially diffuse.

A coupler 62 may be attached to the flexible membrane 16 with a confronting relationship to the waveguide 12. Alternatively, a coupler 66 (FIG. 5) similar to coupler 62 may be attached to the waveguide 12. The coupler 62 may incorporate a single layer or multiple patterned couplers, as illustrated by couplers 39 (FIG. 1). The coupler 62 decreases the coupling area between the flexible membrane 16 and waveguide 12. The coupler 62 also advantageously decreases back-coupling of fluorescent emitted light into the waveguide 12. If significant amounts of fluorescent light were allowed to back couple into the waveguide 12, a full color display could have poor color balance since LWC devices 10 in on state would emit light back into the waveguide 12, which can shift the emission color or luminance of other LWC devices 10 in the on state.

The outcoupling efficiency of the patterned electrode 56, the flexible membrane 16, and the photoluminescent layer 24 (i.e., upper layers) of the LWC device 10 may be calculated by approximating light outcoupling per incidence on the upper surface of the photoluminescent layer 24 as proportional to the series relationship:

$$1+x+x2+x3+x4+x5\ldots=(1-x)-1 \qquad (3).$$

Assuming 30 percent forward diffuse scattering efficiency at the upper surface of the photoluminescent layer 24 and a coupling area which comprises 10 percent of the entire LWC device area, a theoretical maximum forward coupling efficiency greater than 60 percent is achieved. Absent the coupler 62, the majority of the upper layers could be coupled to the waveguide 12 allowing only 15 percent forward outcoupling of fluorescent emission, with 85 percent of the emission back-coupled into the waveguide where it is lost and contributes to the undesired effect of pixel cross-talk in a pixelated LWC display 13.

Suitable materials for coupler 62 include, but are not limited to, those materials suitable for the waveguide 12 and flexible membrane 16, as described herein. Coupler 62 should have a thickness adequate to distance the upper layers from the lower layers consistent with equation (2). In certain embodiments of the invention, a suitable thickness for coupler 62 is on the order of, but not limited to, about 0.1 μm to about 10 μm. The coupler 62 may also serve as a transparent electrode if formed, for example, from ITO. Alternatively, the coupler 62 may serve as a transparent electrode when disposed on the waveguide 12.

Because the majority of the area of LWC device 10*a* is optically transparent, a black absorbing layer 64 may optionally positioned below the waveguide 12, or in contact with cladding 50 (FIG. 3D), to create a dark or black background for the LWC device 10*a* that furnishes high viewing contrast. Exemplary black absorbing layers 64 are described in commonly-assigned U.S. Pat. No. 6,635,306, the disclosure of which is hereby incorporated by reference herein in its entirety.

Figure 5:
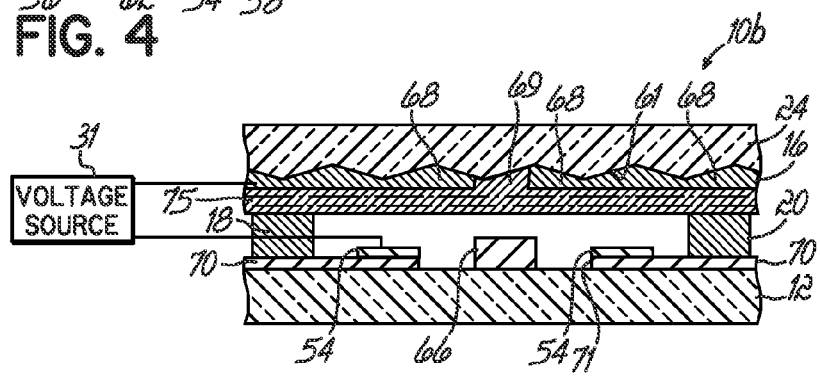

With reference to FIG. 5 in which like reference numerals refer to like features in FIG. 4, a LWC device 10*b* includes coupler 66, similar in construction to coupler 62, attached to the waveguide 12 and an upper electrode 68 embedded in the flexible membrane 16 and/or photoluminescent layer 24 of the LWC device 10*b*. The coupler 66 may assume any geometrical shape, such as a rectangular geometrical shape, that promotes efficient transmission or refraction of light from the waveguide 12 and into the photoluminescent layer when the LWC device 10*b* is in the on state, or internal reflection of short wavelength light back into the waveguide 12 if the LWC 10*b* device is in the off state. The upper electrode 68 serves the purpose as an electrode for electrostatic actuation and as a reflector for improving outcoupling of fluorescent light to the viewer. The LWC device 10*b* further includes a cladding layer 70, similar to cladding layers 48, 50 (FIG. 3D), that physically separates the lower electrode 54 and spacers 18, 20 from the waveguide 12. A lower surface 61 of photoluminescent layer 24 may be optionally rendered partially diffuse, as described above with regard to the upper surface 60, to improve the forward outcoupling efficiency to the viewer.

The coupler 66 is aligned vertically with one or more apertures 69 defined in the upper electrode 68 and with one or more apertures 71 defined in the cladding layer 70, such that light is efficiently coupled from the waveguide 12 and into the photoluminescent layer 24 when the flexible membrane 16 is electrostatically actuated into contact with the coupler 66. Using equation (3) and assuming a 10 percent aperture area for reflective upper electrode, a theoretical maximum forward coupling efficiency greater than about 77 percent is achieved. Because the majority of the area of LWC device 10*b* is optically reflective, an optical element (not shown), such as a neutral density plate, color filter plate, or circular polarizer plate, may be disposed between the display observer and each LWC device 10*b* to give the LWC device 10*b* a black background appearance. Use of such filters is well known by those skilled in the art of displays. Optionally, non-emitting surfaces that reflect ambient light may be contrast-enhanced by adding black paints or black matrix, such as chromium oxide (CrO), familiar to persons of ordinary skill in the art of displays. The reflective upper electrode 68 also prevents the majority of short wavelength light scattered by imperfections in the waveguide 12 from reaching the photoluminescent layer 24, which reduces the off-state luminance of the LWC device 10*b* and is one factor in determining the maximum contrast of the LWC device 10*b*. The reduction in off-state luminance can be similarly achieved by introducing any opaque layer (not shown) between the photoluminescent layer 24 and the waveguide 12, so long as the opaque layer contains an aperture sufficient for allowing adequate switchable coupling between the waveguide 12 and photoluminescent layer 24.

In an alternative embodiment of the invention, the flexible membrane 16 may optionally incorporate or comprise an optical layer 75 that creates a step or graded refractive index profile when in contact with the waveguide 12, as described in FIG. 1, or in contact with coupler 66 on the waveguide 12, as described in FIG. 5. A step refractive index profile for optical layer 75, with the index profile continued into the upper layers, allows coupling of light from the waveguide 12, into the optical coupler 66, and on into the photoluminescent layer 24, but prevents back coupling of light emitted by the photoluminescent layer 24 to the waveguide 12 through internal reflection according to equation (1). A step profile for the refractive index of optical layer 75 does, however, lead to reflective losses arising from Fresnel reflection that increases very strongly with angle of incidence.

An alternative embodiment of the optical layer 75, which exhibits lower reflective losses, will include a multi-step index that decreases the total magnitude of Fresnel reflection. Another alternative embodiment of the optical layer 75 exhibiting lower reflective losses will be a graded index layer (infinite step index) that prevents Fresnel reflection but provides the desired directional coupling. Suitable optical layers 75 include SiON, which achieves an increase of refractive index of 1.5 to 2.0 with increasing O to N ratio. Suitable optical layers 75 also include layered polymers consisting of Brewer Science OptiNDEX polymers with can achieve a refractive index varying from about 1.7 to about 1.9. A layered polymer can achieve an index gradient since the solvent used in liquid deposition of each polymer layer partially dissolves the upper interface of the underlying polymer layer, causing mixing, and therefore a compositional and refractive index gradient. Suitable thicknesses for the optical layer 75 include, but are not limited to, about 0.1 µm to about 100 µm. The optical layer 75 may be a patterned or a continuous film. Alternatively, the coupler 62 (FIG. 4) may incorporate the optical layer 75.

Figure 6:
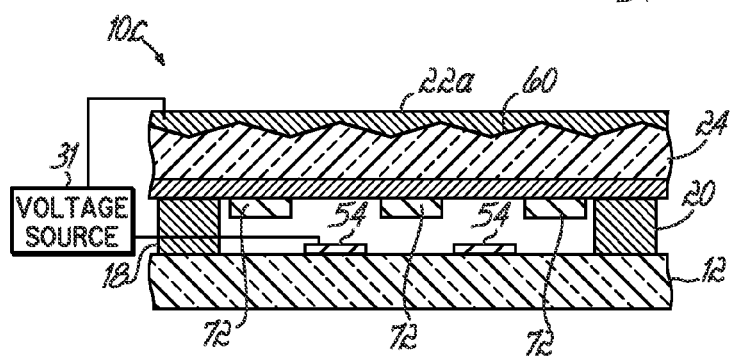

With reference to FIG. 6 in which like reference numerals refer to like features in FIGS. 4 and 5, a LWC device 10c may be configured with a reflective upper electrode 22a such that the fluorescent emission can be directed to exit through the waveguide 12. Unless the waveguide 12 is about an order of magnitude thinner than the width of the area of fluorescence, the majority of the emitting area of the upper layers should be out of optical contact with waveguide 12. For emitted fluorescence from upper layers in contact with the waveguide 12, only about 15 percent is emitted onto the viewer due to internal reflection and propagation within the waveguide 12. For emitted fluorescence from upper layers out of contact with the waveguide, 90 percent is emitted onto the viewer with the 10 percent loss arising from Fresnel back reflection. The interface between the upper electrode 22a and photoluminescent layer 24 may be partially diffuse, as described herein, to enhance outcoupling of emitted light to the viewer. The LWC device 10c includes patterned couplers 72 that allow the photoluminescent layer 24 to receive short wavelength light at multiple locations, hence increasing the uniformity of the emitted fluorescence from the photoluminescent layer 24. Electrodes 22a and 54 are electrically coupled with voltage source 31 for providing a first condition in which short wavelength light is transferred from the waveguide 12 to the photoluminescent layer 24 and a second condition in which short wavelength light remains confined in the waveguide 12.

Figure 7:
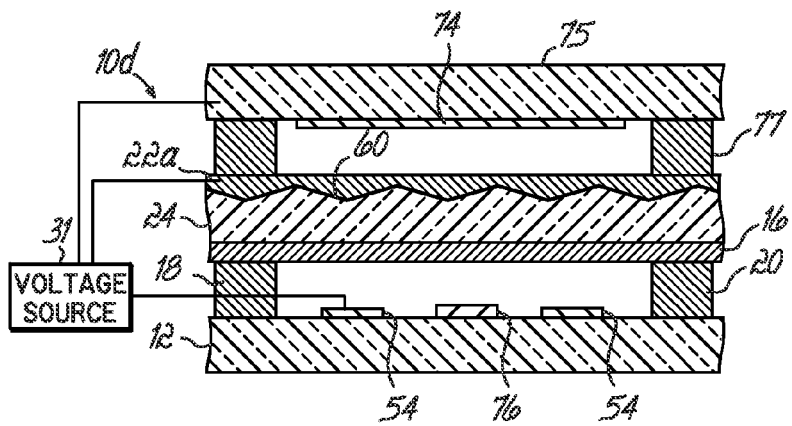

With reference to FIG. 7 in which like reference numerals refer to like features in FIG. 6, a LWC device 10d includes a release electrode 74 that assists the tensile stress in lifting the flexible membrane 16 out of contact with a coupler 76 disposed on the waveguide 12. The release electrode 74 is of particular use for the case of a flexible membrane 16 characterized by a weak restoring force or the instance of a relatively strong inherent electrostatic sticking force between contacting portions of flexible membrane 16 and coupler 76. The release electrode 74 electrostatically pulls the flexible membrane 16 in a direction away from the waveguide 12 when a voltage differential is applied between the release electrode 74 and the upper electrode 22a. The release electrode 74 is physically supported on a support 75 and is suspended above the photoluminescent layer 24 by a rigid spacer 77 composed of preferably silica glass of about 1 to 100 µm thickness. The release electrode 74 is of thickness and composition comparable to those listed for electrodes 14 and 22. Release electrode 74 is also electrically coupled with voltage source 31 for assisting in lifting the flexible membrane 16 from the first condition, in which short wavelength light is transferred from the waveguide 12 to the photoluminescent layer 24, to the second condition, in which flexible membrane 16 is out of contact or proximity with coupler 76 and short wavelength light remains confined in the waveguide 12.

Figure 8:
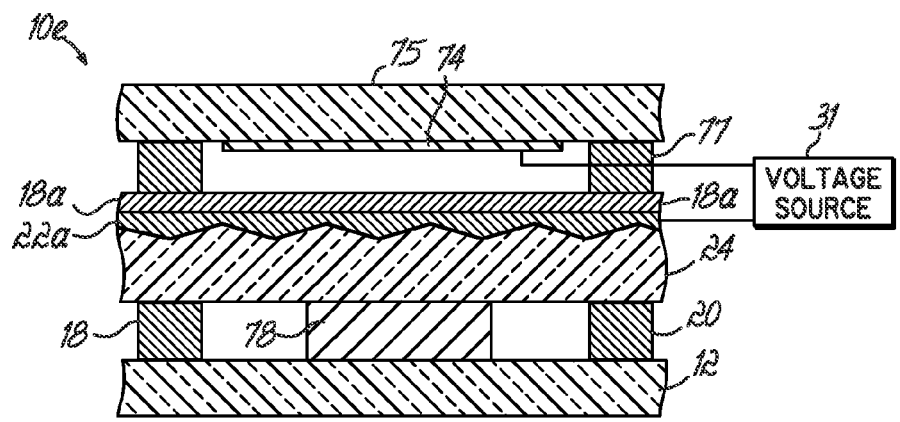

With reference to FIG. 8 in which like reference numerals refer to like features in FIG. 7 and in accordance with an alternative embodiment of the invention, an electrodeless or electrode-free waveguide LWC device 10e includes a coupler 78 of a thickness comparable to or greater than a thickness of spacers 18, 20. Typically, the coupler 78 will have a thickness ranging from of about 0.1 µm to about 100 µm, depending upon the thickness of spacers 18, 20. The coupler 78 mechanically couples the photoluminescent layer 24 to the waveguide 12. The coupler 78 is permanently attached on one surface to either the waveguide 12 or the photoluminescent layer 24. Only through electrostatic actuation is the coupling of short wavelength light into the photoluminescent layer 24 prevented. Applying voltage from the voltage source 31 to the release electrode 74 disposed above a flexible membrane layer 18a provides the electrostatic actuation. The electrostatically-actuated photoluminescent layer 24, upper electrode 22a, and flexible membrane 18a may be alternatively fabricated on the substrate 75 that supports the release electrode 74. The waveguide 12 is bonded to the face of the substrate 75, which contains the electrostatically-actuated photoluminescent layer 24, upper electrode 22a, and flexible membrane 18a and spacers 18, 20, and 77.

The configuration of LWC device 10e permits waveguide 12 to be formed from relatively low melting point polymers, such as PMMA, while allowing for high temperature (greater than about 150° C.) fabrication of the remaining constituent components of LWC device 10e on a separate silica glass substrate 75. Alternatively, the substrate 75 may be comprised of crystalline silicon on which additional display driver circuitry can be provided. Alternatively, the substrate 75 can be comprised of flexible material such as steel, copper, or DuPont KAPTON® on which LWC device 10e is fabricated and subsequently laminated to the waveguide 12. Multiple substrates and attachment techniques for LWC device fabrication and waveguide attachment are possible as recognized by persons skilled in the art of flat panel displays and electrostatic membranes. Similar fabrication on a support substrate is also suitable for other LWC device embodiments of the invention.

Figure 9:
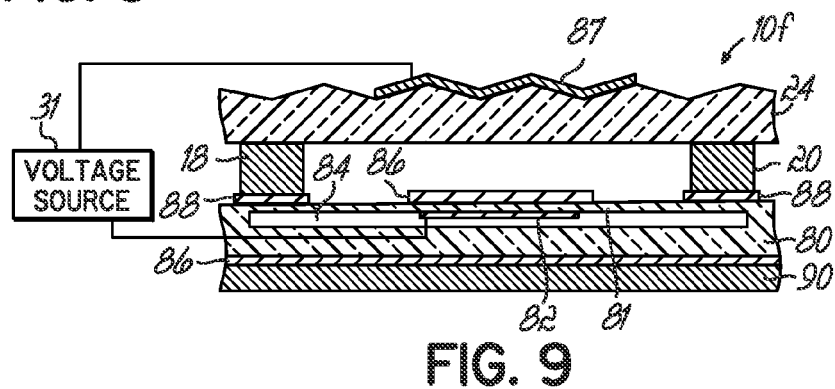

With reference to FIG. 9 and in accordance with an alternative embodiment of the invention, a LWC device 10f is linked with a waveguide 80 having a flexible portion 81 of waveguide 80, capable of being electrostatically actuated in and out of proximity with the photoluminescent layer 24, as separated by coupler 86. Suitable flexible materials for waveguide 80 include SiON, silica glass, and PMMA. Disposed on a lower surface of the flexible portion 81 of the waveguide 80 is a lower electrode 82 that is electrically coupled with voltage source 31. The lower electrode 82 may alternatively be disposed on an upper surface of the flexible portion of the waveguide 80, or within the interior of the waveguide 80. A gas-filled or vacuum gap 84, typically in the thickness range of about 0.01 µm to about 100 µm, is defined beneath the upper flexible portion 81 of the waveguide 80 such that flexible portion 81 is freely actuated. An upper electrode 87 is also electrically coupled with the voltage source 31 so that voltage selectively applied between the electrodes 82, 87 moves the upper flexible portion 81 between the first condition, in which short wavelength light is transferred from the waveguide 80 to the photoluminescent layer 24, and the second condition, in which the upper flexible portion 81 is out of contact or proximity with photoluminescent layer 24 so that short wavelength light remains confined in the waveguide 80.

The upper portion 81 of waveguide 80 may have a thickness in the range of about 0.1 µm to about 100 µm and the overall thickness of waveguide 80 may be about 0.1 µm to about 10 mm. Cladding layers 86, 88 may be provided on the waveguide 80 so that the waveguide 80 may be carried on an additional substrate 90 for physical support. Suitable supporting substrates 90 include, but are not limited to, silica glass, silicon, and polycarbonate. A thinner waveguide 80 and supporting substrate 90 may be incorporated into LWC devices 10 and 10a-e if the cladding layer 86 is included at the bottom of the waveguide 80. Alternatively, the supporting substrate 90 may be integral with the waveguide 80, a suitable example being a PMMA waveguide 80 supported by, and optically bonded to, a silica glass substrate 90.

Figure 10:
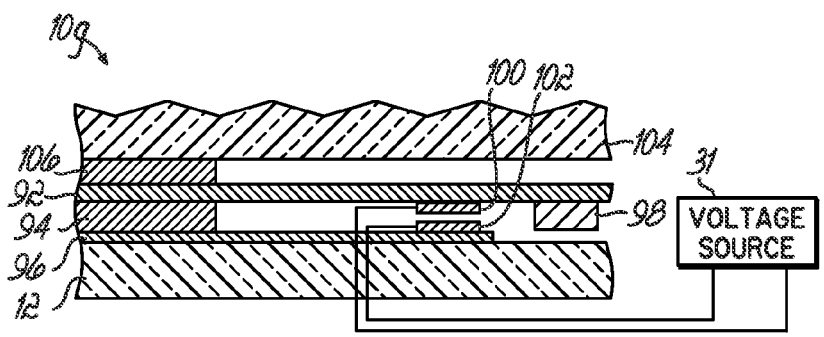

With reference to FIG. 10 in which like reference numerals refer to like features in FIG. 1, a LWC device 10g includes a cantilever beam 92 disposed above a waveguide 12 by a spacer 94 and a cladding layer 96. Disposed on the cantilever beam 92 is a coupler 98 that is electrostatically actuated in and out of contact with the waveguide 12 by applying a differential voltage from voltage source 31 to electrodes 100, 102 disposed onto the cantilever beam 92 and cladding layer 96, respectively. When in contact with the waveguide 12, the coupler 98 allows light to propagate into the cantilever beam 92 where it eventually propagates into a photoluminescent medium or layer 104 causing the photoluminescent layer 104 to fluoresce. The photoluminescent layer 104 is kept out of contact with the cantilever beam 92 by a second permanently fixed coupler 106. Alternatively, the photoluminescent layer 104 may be placed on and carried by the cantilever beam 92. In yet another alternative embodiment, the cantilever beam 92 may be carried by the waveguide 12 and actuated in and out of contact with the photoluminescent layer 104, which may be particularly effective and efficient if the coupling efficiency from the waveguide 12 to the photoluminescent layer 104 requires only a small area (about 1 percent) of the entire LWC device 10g. Because the electrostatically coupled portion is spatially separated from the photoluminescent portion of the LWC device 10g, the coupling and photoluminescent portions of the LWC device 10g may be separately optimized.

The invention contemplates that the electrostatic actuation may be accomplished by any mechanism, including by not limited to electrostatic membranes and cantilever beams as described herein, that allows for switchable optical coupling between a waveguide and a photoluminescent layer as recognized by persons of ordinary skill in the art of micro-electromechanical systems. Furthermore, the invention contemplates that additional layers may be added onto or between individual device layers to improve physical, electrical, or optical properties of the exemplary LWC devices and displays.

Figure 11:
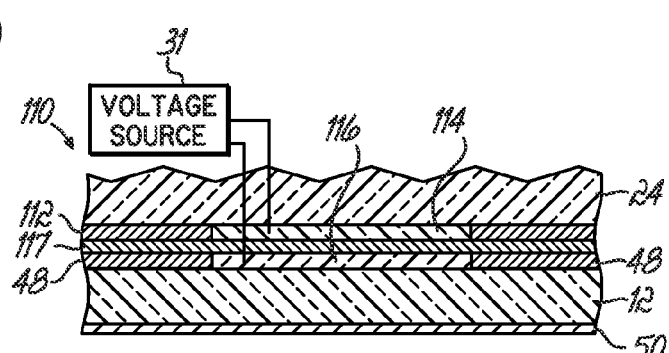

With reference to FIG. 11 in which like reference numerals refer to like features in FIGS. 1 and 3D, an LWC device 110 includes waveguide 12 with cladding layers 48, 50, an electro-optic liquid crystal layer 117 that changes in refractive index with applied field applied by voltage source 31 between two transparent electrodes 114, 116 to provide electro-optical modulation of emission intensity, and a reflector 112 surrounding the electrode 114. The changes in refractive index alter the criterion for internal reflection of short wavelength light in the waveguide 12 and, therefore, modulate coupling efficiency of short wavelength light from the waveguide 12 and into the photoluminescent layer 24. Suitable materials for the liquid crystal layer 112 include, but are not limited to, nematic liquid crystals, ferroelectric liquid crystals, and a polymer dispersed liquid crystal or cholesteric liquid crystal that would modulate coupling of light from the waveguide 12 into the photoluminescent layer 24 by providing a multi-directional refractive effect. In an alternative embodiment, a solid electro-optic polymer or inorganic crystal may be substituted for the liquid crystal layer 112. The performance, choice, and implementation of electro-optic liquid crystals and polymers is well known by those skilled in the art of liquid crystal displays, modulators, and optical fiber modulators. Generally, most electro-optic materials are birefringent and work as an optical switch of the invention for linearly polarized light. For use of the birefringent liquid crystal layer, the short wavelength light is preferably injected into the waveguide 12 such that it is linearly polarized, or such that the short wavelength light incurs incidence upon polarization recycling media such as 3M Vikuiti™ film according to techniques well known by those skilled in the art of liquid crystal display design. The LWC device 110 may also incorporate other features, such as couplers, described herein in the context of the electrostatically actuated devices.

Figure 12:
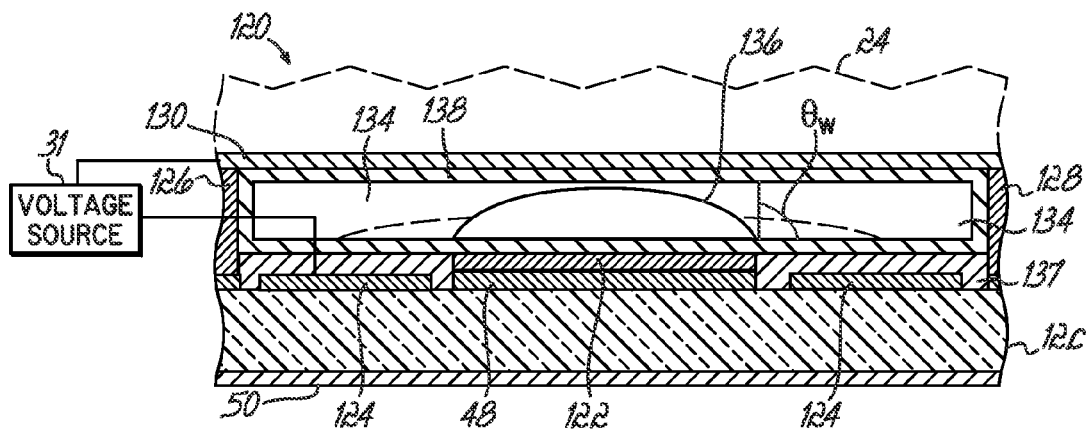
FIG. 12 is a cross-sectional view of an electrowetting-modulated lightwave coupling device in accordance with an embodiment of the invention.

With reference to FIG. 12 in which like reference numerals refer to like features in FIG. 3D and in accordance with an alternative embodiment of the invention, a LWC device 120 that relies on electrowetting actuation includes waveguide 12c with cladding layers 48, 50, a reflector element 122 which may also serve as an electrode, patterned transparent electrodes 124, spacers 126, 128, and an electrically insulating dielectric 137. Upper transparent electrode 130 may also be coated with an insulating dielectric similar to insulating dielectric 137. Encapsulated in a space defined between the waveguide 12c and the upper transparent electrode 130 are a volume of low refractive index, electrolytic or conductive liquid carrier 134, such as salt water, and a body of a liquid photoluminescent medium 136. Photoluminescent medium 136 has a refractive index similar to waveguide 12c and is immiscible with liquid carrier 134. Any or all surfaces contacted by the liquid carrier 134 and/or the photoluminescent medium 136 may include a thin hydrophobic coating 138, which increases the contact angle of the liquid carrier 134 with the coating 138 and reduces the required voltage for electrowetting. Voltage source 31 is electrically coupled with electrodes 124, 130 for selectively applying voltage to provide the first condition, in which short wavelength light is transferred from the waveguide 12 to the photoluminescent medium 136, and the second condition, in which short wavelength light remains confined in the waveguide 12.

An exemplary transparent electrode 124, 130 is 10 nm of ITO. An exemplary dielectric coating 137 on the transparent electrode would be 0.01 to 10 μm of BaTiO3 or other high capacitance oxide based dielectrics. An exemplary hydrophobic coating 138 would be a 0.001 to 10 μm thick layer of a highly hydrophobic fluoropolymer such as DuPont TEFLON® AF.

The photoluminescent medium 136 generally has a refractive index similar to the waveguide 12c and contains non-polar fluorescent dye dissolved in alkanes (typically C10-C16). If a voltage is applied between any two electrodes the surface contact angle θw for liquid carrier 134 is decreased causing it to repel liquid layer 136 away from electrodes 124, 130 on which voltage is applied from voltage source 31. If no voltage is applied to electrodes 124, 130 from voltage source 31, the contact angle θw for liquid carrier 134 increases to an inherent value, causing liquid photoluminescent medium 136 to re-wet the surfaces it was repelled from during application of voltage, as indicated in dashed lines in FIG. 12.

With continued reference to FIG. 12, the absence of applied voltage allows the liquid photoluminescent medium 136 to contact areas of the waveguide 12c not coated with cladding 48, and therefore fluoresce upon receiving short wavelength light from the waveguide 12c. By using salt water (refractive index of about 1.3) or another low refractive index liquid carrier 134, the transparent electrodes 124 not contacted with oil automatically behave as a cladding layer and internally reflects short wavelength light. Multiple electrode arrangements are possible and are not limited to the specific electrode arrangement of FIG. 12, so long as the electrode arrangements provide switchable electrowetted optical coupling to a photoluminescent medium. In an alternate embodiment, liquid carrier 134 and photoluminescent medium 136 may be switched in position therefore reversing the voltage response of the LWC device 120. In other alternate embodiments, liquid carrier 134 and photoluminescent medium 136 may be switched in refractive index and in terms of which liquid contains the fluorescing medium or is electrolytic or conducting. Component arrangements for electrowetting devices are discussed in M. G. Pollack, A. D. Shenderov, and R. B. Fair, Lab Chip, 2, pp. 96-101, 2002, the disclosure of which is hereby incorporated by reference herein in its entirety.

In an alternative embodiment of the invention, photoluminescent layer 24 is provided above the LWC device 120 and carrier liquid 134 and photoluminescent medium 136 are composed of a liquid that is not photoluminescent. The coupling of short wavelength light from the waveguide 12c controlled through modulating the curvature of a coupling lens formed from the non-photoluminescent liquid by electrowetting. In this alternative embodiment, cladding layer 48 and reflector 122 are partially or fully removed or disposed from below the non-photoluminescent liquid, which acts as a switchable optical lens that changes in lens curvature and focuses short wavelength light from the waveguide 12c into the photoluminescent layer 24 or internally reflects short wavelength light back into the waveguide 12c. Multiple arrangements of electrodes, liquids, and other device layers are envisioned within the spirit and scope of the invention.

Figure 13:
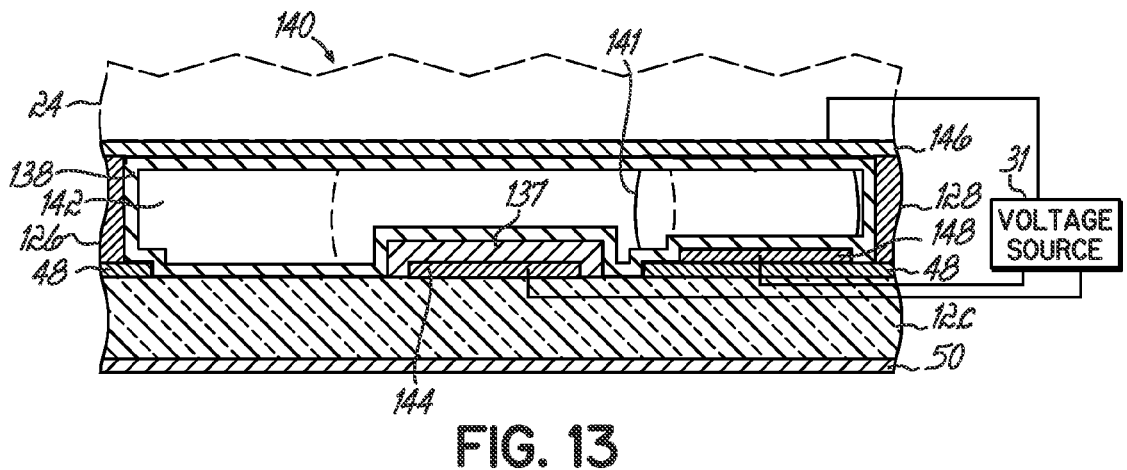
FIG. 13 is a cross-sectional view similar to FIG. 12 of an electrowetting-modulated modulated lightwave coupling device in accordance with an alternative embodiment of the invention.

With reference to FIG. 13 in which like reference numerals refer to like features in FIG. 12, a LWC device 140 is shown that relies on electrowetting for modulating optical coupling between the waveguide 12c and a distinct photoluminescent layer 24. The LWC device 140 includes a lower transparent electrode 144, an upper transparent electrode 146, and a lower electrode 148, which may optionally be transparent, reflective or opaque. Any or all of the electrodes 144, 146, 148 may be coated with a dielectric coating 137, as depicted in FIG. 13 for lower transparent electrode 144. Any or all surfaces contacted by the immiscible liquids, liquid 141 or liquid 142, may include hydrophobic coating 138, which increases the contact angle of the liquid 141 with the coating 138 and hence, reduces the required voltage for electrowetting.

Electrodes 144, 146, 148 are electrically coupled with voltage source 31. If a voltage is applied between any two of electrodes 144, 146, 148, the surface contact angle θw for liquid 141 is decreased causing it to repel the body of liquid 142 away from electrodes 144, 146, 148 to which voltage is applied. This effectively causes liquid 141 to move towards the electrode to which voltage is applied, as indicated by dashed lines in FIG. 13. For the particular arrangement of FIG. 13, but not limiting in possible alternative arrangements, liquid 141 should have a refractive index comparable to waveguide 12c, and liquid 142 should have lower refractive index such that it acts as a switchable cladding.

In an alternate embodiment of the invention, liquid 141 and liquid 142 may be switched in refractive index and in terms of which is electrolytic. Multiple electrode arrangements are possible and are not limited to the specific arrangement of FIG. 13, so long as the electrode arrangements provide switchable electrowetted optical coupling to a photoluminescent medium. In another alternate embodiment, liquid 141 and liquid 142 may be switched in position therefore reversing the voltage response of the LWC device 140. In yet another alternative embodiment of FIG. 13, either or both of liquid 141 and liquid 142 may be photoluminescent resulting in LWC switching similar to that described with regard to FIG. 12. It is understood that the switching for the electrowetting LWC devices 120, 140 is not necessarily not binary or bi-stable in nature and that grayscale operation (intensity modulation) may be achieved through available techniques and through creation of cladding 48 apertures which increase in area linearly, parabolically, or by other mathematical dependence, in a direction in which electrowetting occurs.

In either LWC device 120 (FIG. 12) or LWC device 140 (FIG. 13), either liquid carrier 134 or photoluminescent medium 136, liquid 141 or liquid 142, may be fully or partially replaced with an air or vacuum environment which would then acts a switchable cladding layer (n~1.0) for the waveguide 12c according the principles of operation for electrowetting LWC devices of the invention. The LWC devices 120, 140 may also incorporate other features described herein in the context of the electrostatically actuated devices. The invention contemplates that other suitably controllable electro-wetting mechanisms, as are familiar to persons of ordinary skill in the art of electrowetting and microfluidics, capable of optically coupling or decoupling the waveguide 12c and photoluminescent layer 24 or photoluminescent liquids 136, are within the spirit and scope of the invention. The invention contemplates that LWC devices in which a coupling liquid or gel layer is physically displaced by mechanical actuation is well known to persons of ordinary skill in the art of microfluidics and micro-electro-mechanical systems. As a non-limiting example, an electrostatic membrane may be used to displace a coupling liquid from an area of an LWC device that includes a cladding layer on the waveguide to an area the LWC device which does not include a cladding layer.

Figure 14:
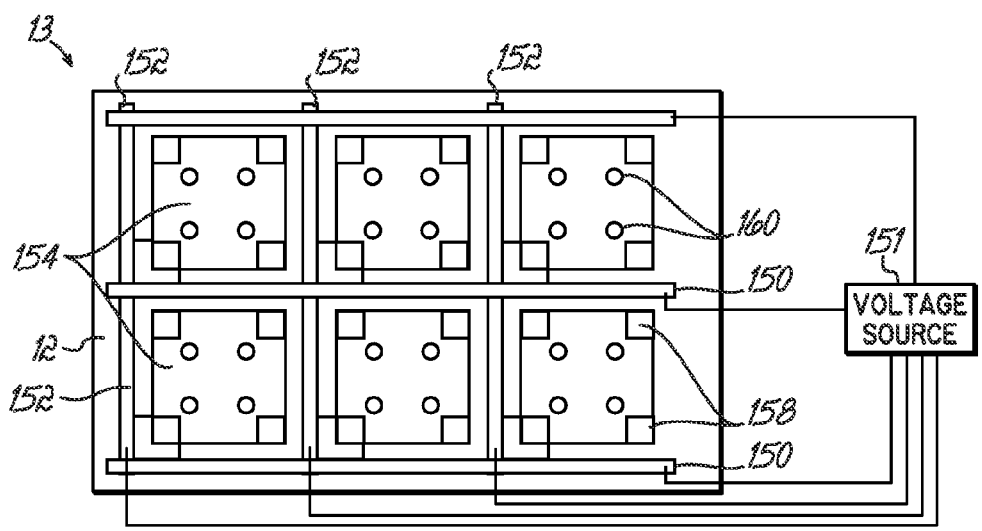
FIG. 14 is a cross-sectional view of a re-configurable information display incorporating multiple devices of embodiments of the invention.

With reference to FIG. 14 in which like reference numerals refer to like features in FIGS. 1-13, any of the LWC devices 10, 10a-g, 110, 120, and 140 described herein may be spatially arranged to create a display 13. Although the exemplary display 13 is described below in the context of electrostatically-modulated devices as pixels 154, it is appreciated that the display may include individual LWC devices or pixels 154 actuated by electro-optic and electrowetting techniques as described herein. Furthermore, it is appreciated that the display may include variations of electro-static, electro-optic and electrowettting techniques derived from the scope and spirit of the invention. Exemplary electro-static, electro-optic, and electro-wetting actuation techniques are described in X. Ma and G. S. Kuo, IEEE Optical Communications, Vol. 41, No. 11, pp S16-S23, November 2003, and in M. G. Pollack, A. D. Shenderov, and R. B. Fair, Lab Chip, 2, pp. 96-101, 2002, the disclosures of which are hereby incorporated by reference herein in their entirety. Each of the electrostatically-actuated pixels 154 incorporates spacers 158 and, optionally, couplers 160, as described herein. An array of row electrodes 150 and column electrodes 152 defines a passive matrix of pixels, generally indicted by reference numeral 154, that may be addressed with, or without, the use of thin-film-transistors (not shown) in an active matrix drive scheme. Each of the pixels 154 may be configured as full color (red, green, and blue), multi-color, or monochrome. In an alternate embodiment of the invention, multiple LWC devices, as described herein, are arranged as a display 13 having the form of a segmented display panel that can be used to display symbols or alpha-numerical information. It should be noted, that an LWC display, if transparent could emit light from sides of the display 13, which increases the number of maximum viewers.

Regardless of whether driven in an analog or digital format, common video enhancement techniques may be used to maximize the response speed, contrast, color purity, and luminance uniformity of display 13. These common techniques are well known to persons of ordinary skill in the art of liquid crystal, electroluminescent, plasma, field-emission, and cathode-ray tube displays.

With continued reference to FIG. 14, panel luminance level and uniformity, irrespective of percentage of pixels 154 in the on state, may be boosted by using a low loss waveguide 12c with a cladding layer 48, 50 (FIG. 3D). Panel luminance level, which varies as the percentage of LWC devices 10 of display 13 in the on state changes from display frame to display frame, may be maintained substantially constant by modulating the intensity of the short wavelength light source(s) 34 (FIG. 3A). Amplitude, frequency, or duty cycle modulation of CCL and LED short wavelength light sources 34 generally have a response time of less than 1 ms which is fully adequate for supporting a typical display frame rate of 60 Hz. The intensity modulation is preferably performed though additional circuitry and/or display software that analyzes the incoming video signal and calculates via an algorithm the correct power to be provided to the short wavelength light sources 34. This power distribution could also be non-uniformly distributed to short wavelength sources at multiple locations of the waveguide 12. Dimming display 13 for day/night use, such as in automobile usage, is also easily achieved using similar techniques.

The average emitted luminance from the pixels 154 may be modulated by applying a voltage differential from a voltage source 151 between electrodes 150, 152 of those pixels 154 to be electrostatically attracted. One of the two electrodes 150, 152 may be held at ground potential (i.e., zero volts) or at a voltage having the opposite polarity of the opposing electrode 150, 152, so long as an electric field is applied between the pixels 154 to provide electrostatic attraction. It is appreciated that multiple different techniques apparent to persons of ordinary skill in the art may be used to provide electrostatic actuation.

In a pixelated full color LWC display 13, red, green, and blue photoluminescent pixels 154 would be arranged and addressed within the matrix of row and column electrodes 150, 152. As an example, a net voltage differential of 5 volts may used to affect electrostatic actuation of each pixel 154, with a 2.5-volt hold voltage utilized to maintain the electro-static actuation. This is possible if the combined inherent electro-static force and the 2.5 volt induced static force are greater than the restoring force. A ground, or 0 volt, signal would be applied to allow the restoring force to return the actuated layers to their original location. In a row-column electrode format, an exemplary addressing scheme, assuming that pixels 154 are in a normally off state, would be to sequentially address row electrodes 150 with 0 volts and hold all non selected row electrodes 150 at 2.5 volts. The column electrodes 152 would then provide either 0 volts or 5 volts as each row electrode 150 is selected and held at 0 volts. Therefore, only when one of the row electrodes 150 is selected will one of the pixels 154 be switched into on or off emission states. This form of operation is bi-stable, and results in addressing of a multi LWC device array with passive matrix row and column electrodes addressing. Alternatively, active matrix addressing can be employed with use of thin-film transistors (not shown) at each pixel 154 that holds the appropriate on or off voltage to the pixel 154.

For gray-scale operation several approaches are suitable and include using spatial dithering of multiple sub-pixels addressed per pixel 154 (i.e. 16 sub-pixels in 1 pixel for 16 levels of grayscale). Alternatively, voltage modulation can be used through capacitive charge up of each pixel 154 in the on state, the amount of charge proportional to the applied voltage, the averaged luminance proportional to the amount of built up charge if a parallel leak resistor (not shown) is utilized to slowly dissipate the charge/field between the electrostatic plates. This, however, requires a rectifying diode (not shown) at each pixel 154 to block charge leakage back into the electrode 150, 152 supplying the modulation voltage. Other commonly known approaches, such as sub-frame frequency modulation, duty cycle modulation, and amplitude modulation, are also applicable to LWC grayscale operation. Generally, electrostatic devices have a response time on the order of about 10 kHz to about 1000 kHz, which makes frequency or duty cycle modulation fully possible.

Active matrix addressing of pixels 154 opens up several attractive possibilities for grayscale operation. Suitable methods include pulse width modulation, or duration, per each panel refresh, that a given pixel 154 is held in the on state. The pulse width modulation approach is particularly attractive, with the pulse width control supplied by a TFT circuit and triggered by voltage modulation on the row electrodes 150 and column electrodes 152.

Unlike interference modulated display pixels that must keep the electrode plates parallel for proper operation, electrostatic pixels 154 permit the membranes 16 and associated upper electrode 22 (FIG. 1) to be flexible across the entire pixel cell. This would in turn allow grayscale modulation by increasing or decreasing the area or number of coupling contacts by having several levels of voltage applied between the electrostatic electrodes. Different response with different levels of voltage across the pixel 154 can be achieved by having couplers, such as coupler 62 (FIG. 4), of varying thickness or separation distance, the couplers 62 with larger thickness or close separation requiring less voltage in order to be actuated into a coupling state. Furthermore, the electro-optic device 110 (FIG. 11) may also be modulated in emitted luminance by modulating the applied voltage (electric field) to the electro-optic element, therefore modulating the amount of light coupled from the waveguide 12 and into the photoluminescent layer 24. Furthermore, the electrowetting devices 120, 140 (FIGS. 12 and 13) may also be modulated in emitted luminance by modulating the applied voltage to the attracting or repelling electrode, therefore creating several levels of partial optical coupling. Alternatively, the electrowetting devices 120, 140 may be modulated in emitted luminance by having multiple electrodes, one for each level of grayscale to be achieved, and each electrode receiving voltage in order to actuate a respective level of grayscale.

Figure 15:
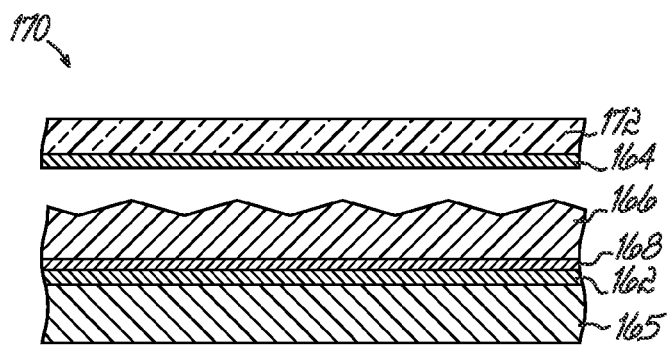
FIG. 15 is a cross-sectional view of a low reflectivity emissive device in accordance with an embodiment of the invention.

With reference to FIG. 15 and in accordance with an alternative embodiment of the invention, a device 170 includes at least two color filters 162, 164 for decreasing ambient reflection from the LWC device 170 without significant loss in emitted luminance. Furthermore, color filter 164 absorbs short wavelength ambient light and prevents ambient light absorption and excitation of a photoluminescent medium or layer 166. The reduction of ambient light reflection and fluorescence has the effect of increasing display contrast ratio.

Color filter 162, which is optically transparent only at relatively short wavelengths such as ultra violet, violet, or blue light, is disposed between a light source 165 and a photoluminescent layer 166. An optical layer 168 comprising one of a gas or vacuum gap, step index, or graded index layer is disposed between color filter 162 and photoluminescent layer 166. Optical layer 162 prevents longer wavelength fluorescent light emission in the photoluminescent layer 166 from back-coupling into the color filter 162 where it would be absorbed. Color filter 164 is optically transparent only at wavelengths where color filter 162 is optically opaque. Furthermore, the color filter 164 is optically transparent only to longer wavelength light (green, yellow, red). Color filter 164 is positioned on a color filter plate 172 that serves as the viewing glass in a display panel or, alternatively, may be in contact with the photoluminescent layer 166.

The device 170 has the capability of minimal attenuation of emission of fluorescence while eliminating ambient light reflection from layers underlying the color filter 164, which provides a black background appearance. Suitable materials for color filters 162, 164 include Brewer Science PSC filter resins and other color filter materials well known by those skilled in the art of displays. Suitable color filter thicknesses range from about 0.1 µm to 100 µm. The color filters 162, 164 may be continuous films or suitably patterned films. In an alternate ordering scheme, the optical filter 162 may be a short wavelength reflector disposed to the side of a transparent short wavelength light source 165 facing away from the photoluminescent layer 166. This optically filtering reflector would reflect short wavelength light and absorb all ambient light passed through the second long wavelength optical filter 164. Suitable short wavelength light sources 165 include the waveguides of LWC devices, inorganic and organic light emitting diodes, inorganic electroluminescent phosphors, cathodoluminescent phosphors, photoluminescent phosphors, and light emitting plasmas. Suitable implementation of such short wavelength sources in display devices is well known by those skilled in the art. The device 170 may also be used to fabricate LED indicator lights that are black in appearance when turned off.

Figure 16:
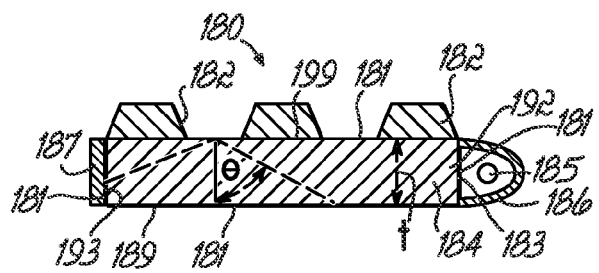
FIG. 16 is a cross-sectional view of a signage device in accordance with the principles of the invention, showing the basic mechanical structure of the full color luminescent ink signage device with a single light source, waveguide, reflective surfaces, collection optics, and luminescent inks.

With reference to FIG. 16 and in accordance with an alternative embodiment of the invention, a signage device 180 includes a lightguide or waveguide 184 and a pattern of photoluminescent features 182 coupled to the waveguide 184. The signage device 180 may include a substrate 181 made from an optically transparent material (to light with a wavelength in the range, for example, of about 350 nm to about 420 nm), such as a glass like Corning Incorporated 7740, or a polymer or plastic, such as polymethylmethacrylate (PMMA) formulated without UV absorbers or whiteners near about 400 nm. While a rectangular waveguide is depicted in FIG. 16, non-planar waveguides such as cylinders or other curved or irregular shapes may alternatively be used as long as the radius of curvature of the non-planar waveguide does not largely cause exceeding of the critical angle for propagating short wavelength light in a waveguide 184. The signage device 180 may provide a unique format for creating efficiently luminescent, flexible, and transparent signage devices and may also be useful as an efficient backlight for a liquid crystal display, which would then not require color filtering.

The photoluminescent features 182 may include inks that fluoresce with high internal quantum optical efficiency, such as 80% or greater when "pumped" with primary light in the wavelength range of about 350 nm to about 420 nm. The light emitted by the photoluminescent features 182 may be, for example, light of a wavelength in the range of about 420 nm to about 650 nm. These inks may be applied by screen-printing, inkjet printing, spraying, lithography, or any other approach suitable to enable the photoluminescent features 182 to optically bond with the substrate 181.

The primary light source energy may be uniformly distributed over the viewing area of the entire signage device to optimize the brightness of any color produced at any location on a signage device. It may be therefore desirable for the primary light to make several passes across the waveguide 184 in order to improve the brightness uniformity of the activated luminescent inks. This may be facilitated by the fact that, when sufficient primary light is produced and properly distributed, some amount of primary light passes through the waveguide and reflects off the waveguide edge opposite the location of the light source 185. Brightness uniformity may be calculated, for example, by taking the value of brightness at any point on the signage device and dividing it by the value at the brightest point. Preferred brightness uniformity may necessitate 1.0 reflection or more along a major dimension of a waveguide 184, as explained above. An adequate design of a waveguide 184 and respective light sources 185 may, for example, achieve a luminance non-uniformity value of less than 0.5.

A simplified version of the optical model utilized to prevent luminance non-uniformity (ΔL) may be given in two-dimensional form as:

$$\Delta L \propto \frac{l_w \times CF}{t_w \times \tan\theta_w},$$

where lw and tw are the respective length and thickness of the waveguide 184, CF is a photoluminescent feature/waveguide pixel coupling factor, and θw is an incidence angle for primary light at the waveguide/photoluminescent feature waveguide/pixel interface 199. CF is the maximum percentage of primary light that can be transferred from the waveguide 184 each time the light is incident on the photoluminescent feature/waveguide interface 199. The waveguide 184 parameters lw, tw, θw together dictate the number of times primary light is incident upon the photoluminescent feature/waveguide interface 199 during one propagation across the major dimension of the waveguide 184. During one propagation of primary light across the waveguide 184, a high number of times primary light is incident on the photoluminescent features 182, in conjunction with a strong absorption per light incidence (CF), results in a low luminance uniformity. A low level of attenuation of primary light propagation, therefore, is preferred. A reduction in the attenuation of primary light per waveguide traverse allows primary light to make multiple trips across the major dimension of the waveguide 184, which averages the amount of light available for utilization by each luminescent feature 182 and reduces luminance non-uniformity. Even use of a primary light source at only one edge of the waveguide 184, combined with allowing only two waveguide traverses before 50% light attenuation, may provide proper luminance uniformity. Similarly, CF can be decreased through an advanced optical design of the luminescent features 182. Finally, utilizing one or more optical elements, such as element 191 (FIG. 17) may focus light from the primary light source thereby increasing θw and improving luminance uniformity.

The photoluminescent features 182 may be formed of a material having a refractive index of 1.3 and screen printed in a pattern onto the waveguide 184. The material of substrate 181 of waveguide 184 may have a refractive index of 1.5. The lower refractive index of 1.3 of the photoluminescent features 182 permits the coupling of light from the waveguide 184 to the photoluminescent features 182 to be conducted primarily via frustrated internal reflection and absorption by the fluorescent medium in the photoluminescent features 182. The resin matrix for screen-printing the photoluminescent features 182 may also, for example, contain a strong solvent that partially dissolves the upper surface of the substrate 181 exposing underlying waveguide 184. The surface of substrate 181 may be covered by a coating or a cladding material that is partially dissolved by the solvent.

The photoluminescent features 182 may take on different shapes and materials. Features 182 may, for example, be slightly diffuse, have a slightly textured surface, or have a lens shape or other suitable geometrical shape that promotes improved light outcoupling. Photoluminescent features may further include acrylic as a host medium. When acrylic is used, it may further include light stable fluorescent particles and ultra-violet stabilizer additives.

A light source 185 and reflector 186, respectively similar to light source 34 and reflector 36 of FIG. 3A, are positioned relative to the waveguide 184 to inject light of a selected wavelength, such as light in the range of about 380 nm to about 420 nm, through an end 192 of and into the waveguide 184. The injected light is subsequently directed to the photoluminescent features 182. The light source 185 may comprise a substance that at least partially emits light of the desired wavelength and may be, for example, a CCFL lamp, an array of LED's, a fluorescent tube, a light-emitting diode, a solid-state laser or an image plane created by light remotely projected from an arc lamp.

The signage device 180 further includes a reflector assembly 186, which is similar to reflector 32 of FIGS. 3A-3B. The reflector assembly 186 is mounted about the light source 185 to reflect light not originally directed at an edge 183 of the waveguide 184, thus reducing the loss of light of the primary wavelength. Reflector assembly 186 may be made of any suitable material. Reflector assembly 186 may be constructed, for example, from a mirrored plastic film that adequately reflects light with a wavelength in the range of about 380 to about 420 nm, may be coated molded plastic or have metal components, may include electroformed metal reflectors, or may have another suitable construction and/or surface finishes capable of enhancing retention, within the waveguide 184, of the light from the light source 185. To optimize the light collection efficiency, reflector assembly 186 may be predominantly parabolic in shape where the largest dimension of light source 185 is equal to or smaller than the thickness tw, of the waveguide 184, or predominantly elliptical in shape where such dimension is larger than the thickness tw.

Reflectors 187 may be applied to other edges 193 of the waveguide 184 for the purpose of recycling light back into the body of the waveguide 184 by reflection. Edges 189, which are not equipped with reflectors, may be polished by way of a chemical, mechanical, or heat treatment so as to maximize total internal reflection (TIR) of the recycled light. The signage device 180 is activated by powering the light source 185. The waveguide transfers light of a wavelength, for example, in the range of about 380 nm to about 420 nm, to the photoluminescent features 182 thereby causing fluorescence of the inks contained therein. Alternatively, the light source 185 may inject light of other wavelengths, such as in the range of about 350 nm to about 380 nm. In one aspect of the invention, the electrical power to the light source 185 may be modulated, for example, to attract attention or be part of a more complex imaging strategy.

Figure 16A:
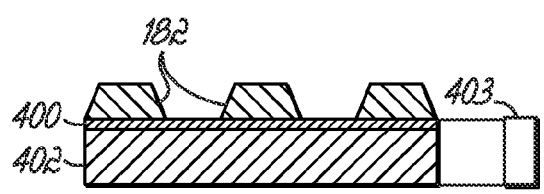
FIG. 16A is a cross-sectional view of a signage device similar to that of FIG. 16 wherein the photoluminescent features are formed on a thin, flexible sheet.
Figure 21:
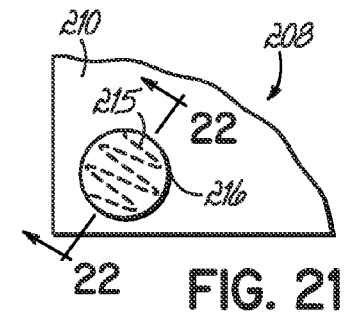
FIG. 21 is a top view showing a portable light source that might be optically coupled to a storefront window or point-of-purchase display case.
Figure 22:
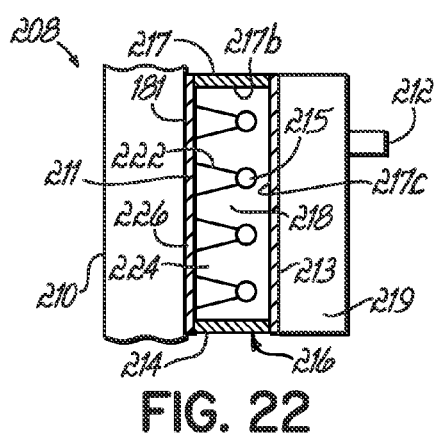
FIG. 22 is a cross-sectional view of the portable light source of FIG. 21.

With reference to FIG. 16A, the waveguide 184, photoluminescent features 182, and other adjacent layers (not shown) may also be formed as a flexible film or thin sheet 400 that is laminated and therefore optically coupled onto a thicker substrate defining a waveguide 402 that receives the short wavelength light from a light source 403. Furthermore, the short wavelength primary light may be supplied by a light source similar to portable light source component 216 (FIGS. 21, 22). The waveguide 402 may comprise a window pane, which can be transformed into an LWC signage device by simply laminating a short wavelength light source, such as light source component 216 and associated waveguide, and laminating sheet 400 bearing the appropriate graphics to the window in the form of a flexible waveguide carrying the photoluminescent features and other optical layers.

Figure 17:
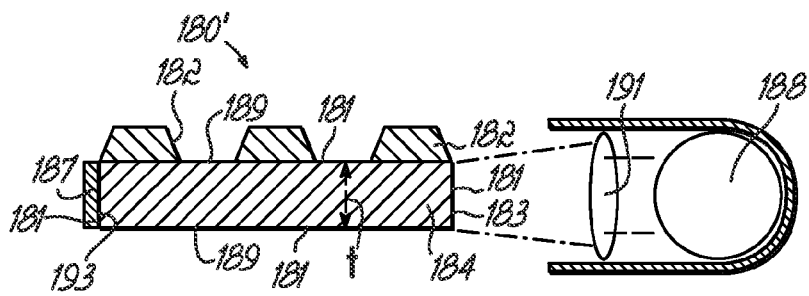
FIG. 17 is a cross-sectional view of a signage device similar to that of FIG. 16 but having a larger light source and an optical element.

With reference to FIG. 17, in which like reference numerals refer to like features in FIGS. 1-16 and in accordance with an alternative embodiment of the invention, a signage device 180' is constructed similar to signage device 180 but includes a primary light source 188 that is larger than the thickness tw of the waveguide 184. A condensing/field optical element 191, such as a lens, is positioned between the waveguide edge 183 and the primary light source 188, as shown, to focus the light from the light source 188 into the waveguide 184.

Figure 18:
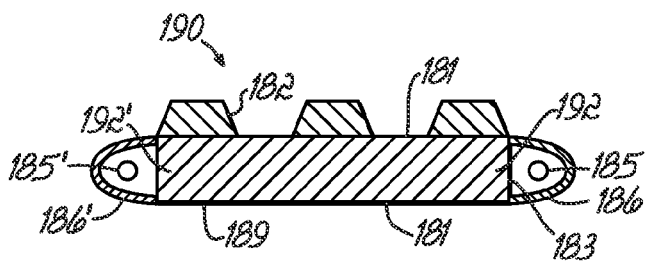
FIG. 18 is a cross-sectional view of a signage device similar to that of FIG. 16 but having two light sources.

With reference to FIG. 18, in which like reference numerals refer to like features in FIGS. 1-17 and in accordance with an alternative embodiment of the invention, a signage device 190 is constructed similar to the signage device 180 (FIG. 16) but includes two light sources 185, 185' coupled to the waveguide and located at opposed ends 192, 192' of the signage device 190. This type of signage may be useful where more power is needed to activate luminescent inks contained in the photoluminescent features 182, such as with relatively large area signs or where more brightness may be desired. Functionally, light sources 185, 185' are adapted to emit light of a wavelength, for example, in the range of about 380 nm to about 420 nm.

Figure 19A:
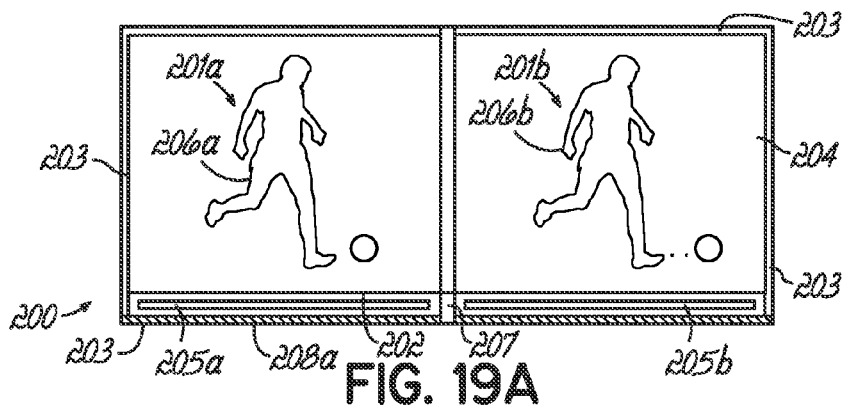
FIG. 19A is a top view of a signage device depicting the use of multiple light sources that, through electric light control, can create spatial and temporal sequencing of images on a single waveguide.

With reference to FIGS. 19A, in which like reference numerals refer to like features in FIGS. 1-18 and in accordance with an alternative embodiment of the invention, a signage device 200 includes multiple light sources 205a, b configured along one edge 202 of a waveguide 204 which may be divided into two segments by a barrier or partition 207 which may be, for example, a light barrier or air gap. The edges 203 of waveguide 204 may include reflectors 208 or mechanical and/or chemically polished surfaces. Similarly to the signage device 190 (FIG. 18), the signage device 200 has the benefit of overall signage brightness. Placing the light sources 205 along one edge 202 permits sequential powering, at various time frequencies, of the light sources 205a, b of the primary wavelength light (in the range, for example, of about 380 nm to about 420 nm). The sequential powering of the light sources 205a, b activate inks contained in photoluminescent features 206a, b located on a surface of waveguide 204. The temporal and spatial effects of the fluorescing inks, so activated, may add dynamic impact to the device and simulate motion effects for the viewer. For example, an image 201a may be visible on signage device 200 when light sources 205a along edge 202 and on one side of the partition 207 are powered to emit primary light, as shown in FIG. 19A. When light sources 205b on the opposite side of the partition 207 are powered to emit primary light, an image 201b is visible on device 200 that, because of the visual perception of the viewer, appears to advance across the width of the signage device 200. Image 201b may include the initial image 201a as a component because of persistence of image 201a.

Figure 19B:
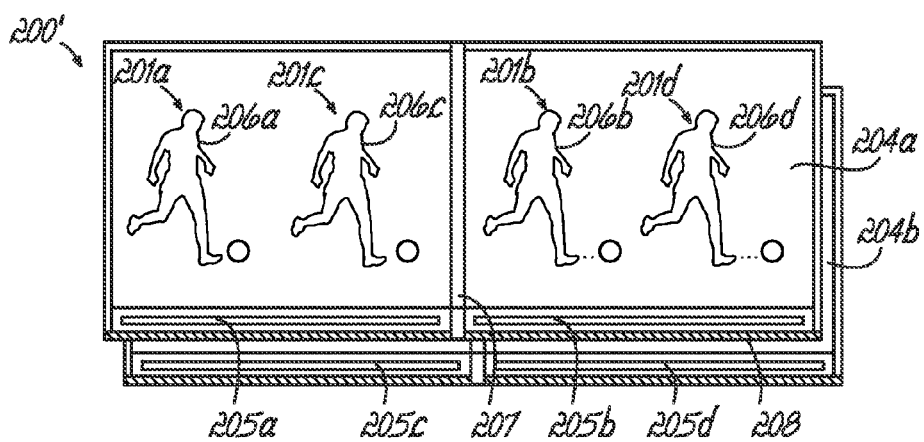
FIG. 19B is a top view of a signage device depicting another example of the use of multiple light sources that, through electric light control, can create spatial and temporal sequencing of images on multiple waveguides.

With reference to FIG. 19B, in which like reference numerals refer to like features in FIG. 19A, a signage device 200' may comprise waveguides 204a, b similar to waveguide 204 (FIG. 19A) in a stacked arrangement, as shown, to further enhance the complexity of images that can be projected onto a surface of waveguide 204a by sequential powering of respective light sources 205a, b, c, d. Signage device 200' may include photoluminescent features 206a, b, c, d, respectively activated by light sources 205a, b, c, d. The temporal and spatial effects of the fluorescent inks, combined with suitable levels of transparency between waveguides 204a, b, may add dynamic impact to the device and simulated motion effects for the viewer, as shown in FIG. 19B, displaying independent images 201a, b, c, d. Signage device 200' may project and sequence, for example, up to about 16 different display images.

Figure 20:
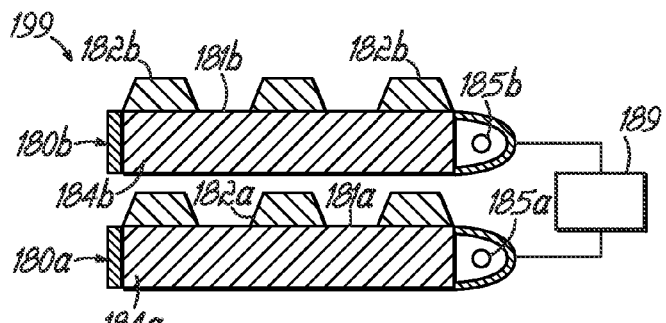
FIG. 20 is a cross-sectional view of an embodiment of a signage device having multiple light sources and multiple waveguides patterned with luminescent ink creating multiple, superimposed full color images.

With reference to FIG. 20, in which like reference numerals refer to like features in FIGS. 1-19 and in accordance with an alternative embodiment of the invention, a signage device 199 is constructed by arranging two individual signage devices 180a and 180b, each substantially identical to signage device 180 (FIG. 16), in a stacked arrangement. Signage device 199 capitalizes on the full transparency of the inks contained in photoluminescent features 182a, b of signage devices 180a, 180b, respectively, to produce a visual image. Waveguide 184b includes a fully transparent substrate 181b, such that when light source 185b is not activated, an image from signage device 180a, or any other backplane such as a printed board stock, can be viewed without obstruction from signage device 180b. A control device 189, operatively coupled to light sources 185a, 185b, may control the sequencing and powering of light sources 185a, 185b to produce the desired visual image. The control device 189 may further include wireless means to control the light sources 185a, 185b. While the signage device 199 depicts two signage devices 180a, 180b, persons skilled in the art will recognize that additional signage devices may be supplied in a fully stacked or partially stacked arrangement of signage devices 180a, 180b. Powering the individual light sources 185a, 185b of the signage devices 180a, 180b can create a captivating visual display of alternative images and multi-image collages. Alternatively, a signage device 199 may be constructed by stacking devices such as the embodiment shown in FIG. 16A.

With reference to FIGS. 21 and 22, and in accordance with an alternative embodiment of the invention, a signage device 208 includes a portable light source component 216 carrying a light source 215 that may be used to inject light in the range, for example, of about 380 nm to about 420 nm into a waveguide 210 for the purpose of exciting luminescent inks contained in photoluminescent features (not shown) similar to photoluminescent features 182 (FIG. 16). The light source 215 may comprise, for example, CCFL tubing, an LED, a diode or a transistor laser, or any type of light source capable of emitting light of suitable wavelength. For example, the light source 215 may specifically comprise a folded CCFL tube, as shown in FIG. 21.

As best shown in FIG. 22, the portable light source component 216 includes a mechanical holder 219 defining a cavity 224 substantially filled with a potting material 218. The light source 215 is embedded in the potting material 218. The light source component 216 is attached to the waveguide 210 by an optical coupling fluid or film 211. Alternatively, coupling fluid or film 211 may not be required, for example, if the index of refraction of the substrate defining the waveguide 210 and that of the potting material 218 are closely matched. The holder 219 may further include a mechanical switch 212 and/or other electronic components including but not limited to electromechanical switches, automated photo-diode circuits, touch-screen buttons, or wireless controls suitable to power and modulate the light source 215. Reflective members 213, 214, and 217, which may be made out of like or different materials, form portions of holder 219 and bound all sides of the cavity 224. The reflective members 213, 214, 217 recycle light by reflecting the light back into the light source 215 or in a direction suitable to inject the reflected light into the waveguide 210. Reflective material and/or TIR features 222 may be incorporated into cavity 224 to restrict the angle of the light entering the waveguide 210, which promotes efficient coupling. For example, light rays directed orthogonally to the waveguide surface 226 may pass through the waveguide 210 and escape from the signage device 208 without being directed by the waveguide 210 to the photoluminescent features. The waveguide 210 may distribute the light from the portable light source component 216 in two dimensions in a fashion similar to that of an optical fiber, which distributes the light along its axis, or by TIR, namely, with a relatively high efficiency (i.e. low loss). TIR requires a reasonably shallow angle of light to pass into and through the waveguide 210.

Figure 23:
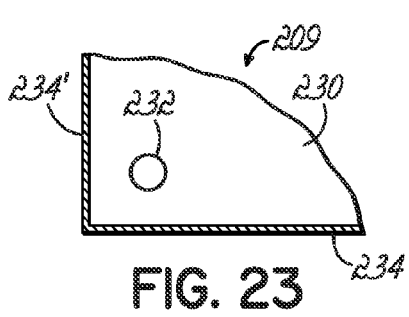
FIG. 23 is a top view showing embedding of the light source into the waveguide itself.

With reference to FIG. 23 and in accordance with an embodiment of the invention, a signage device 209, which is similar to signage device 208 (FIG. 22), includes a light source 232 that is embedded into and encapsulated by a waveguide 230. Embedding the light source 232 in the waveguide 230 may facilitate good optical coupling and coupling efficiency. Other benefits may include the ability to incorporate multiple light sources in a single waveguide 230, as well as the production of smaller, low-cost systems that may be used, for example, in disposable signage devices. The light source 232 of signage device 209 may be powered by conventional wired means, or alternatively by induction or another wireless technique. Embedding the light source 232 in the waveguide 230 furthermore permits the entire surface of an edge, such as edges 234, 234', to be made reflective, by using, for example, mirrored films, coatings, appliqués, or polishing techniques.

Waveguide 210 (FIGS. 21, 22) and waveguide 230 (FIG. 23) may be constructed from a rigid or flexible, and organic or inorganic material. Optically, the material used for waveguides 210, 230 may be transparent at least in a wavelength in the range of about 380 nm to about 420 nm wavelength range. A material such as polymethyl methacrylate (PMMA), for example, may be a suitable material because of its transmissive qualities as well as its impact strength, cost and availability.

Figure 24:
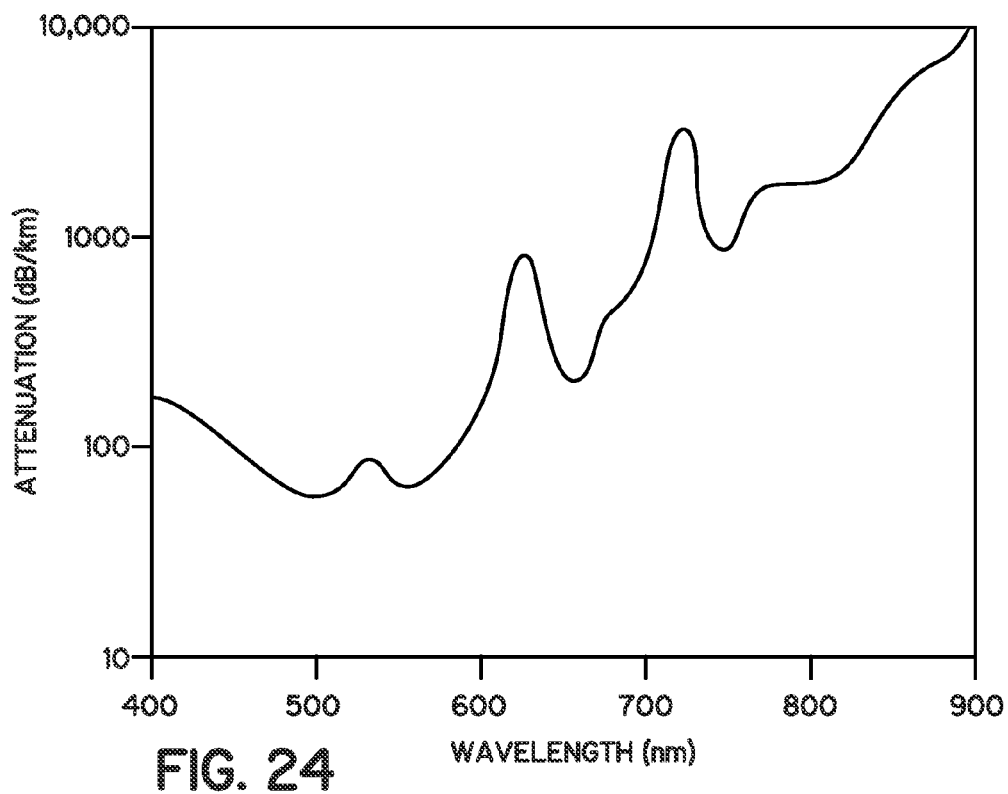
FIG. 24 is a chart depicting the transmission of PMMA, an exemplary waveguide material, due to its low absorption at about 400 nm wavelength.

With reference to FIG. 24, PMMA exhibits a relatively low loss level of light (in attenuation units) at the 400 nm wavelength level, which is important for low loss transmission of the primary light across a waveguide. As mentioned above, this property makes PMMA a suitable material for the construction of waveguides 210, 230 (FIGS. 21-23).

Figure 25:
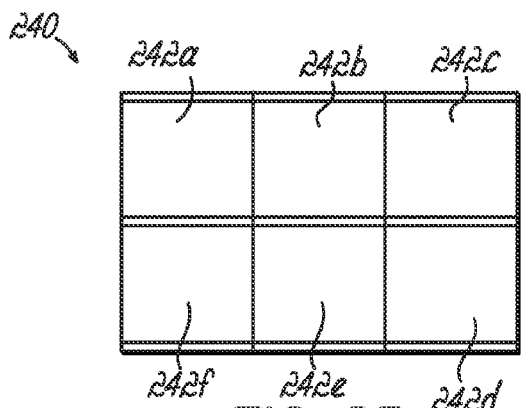
FIG. 25 is a top view of a tiled sign created by placing multiple full color signage devices together.

With reference to FIG. 25, and in accordance with an embodiment of the invention, a tiled signage device assembly 240 is made of a two-dimensional two-by-three array of signage devices 242a-f. In this embodiment, each of the signage devices 242a-f may be adapted to display one or more images. The tiled signage assembly 240 may, for example, display between one and six discrete images at any given time. Furthermore, multiple imaging devices such as signage device 199 (FIG. 20) may be arranged as shown in FIG. 25, to display, for example, between two and sixty-four discrete images.

Figure 26:
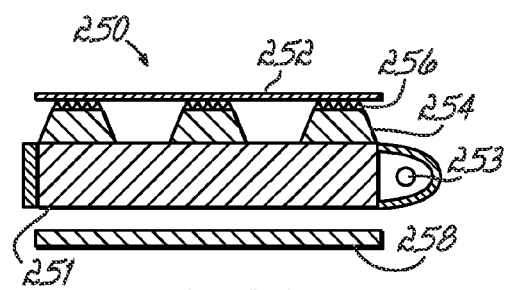
FIG. 26 is a cross-sectional view of a signage device including anti-reflection coatings, lenticular or prismatic optical structures to direct the RGB light, and a backplane.

With reference to FIG. 26, and in accordance with an embodiment of the invention, a signage device 250, which is similar to signage device 180 (FIG. 16), includes a waveguide 251 and a light source 253 positioned on one side of the waveguide 251. Signage device 250 includes a coating 252 applied to an outermost surface of the device 250 and facing the viewer. The coating 252 may reduce glare and/or increase mechanical durability of the device 250. Coating 252 may further comprise an antireflective and/or an abrasion-resistant or scratch-resistant coating or surface relief structure. For example, a moth-eye anti-reflective structure or a spray-on fluoropolymer may be suitable for such purposes. An anti-abrasion treatment may, for example, include a poly-siloxane coating.

Signage device 250 further includes photoluminescent features 254 similar to the features 182 of signage device 180 (FIG. 16). The surface 256 of the photoluminescent features 254 of signage device 250 are patterned to direct and concentrate light in the direction of the viewer. Such patterns could, for example, be refractive or diffractive, such as those of blaze gratings or holograms. Alternatively, a lenticular surface or a prismatic surface could be applied to direct the light emitted by photoluminescent features 254 to a viewer. Signage device 250 further includes a background 258 located on the opposite side of the waveguide 251 from the coating 252. Background 258 of the signage device 250 may, for example, contain information or be a component that adds color or texture. A black, low reflectivity background 258, for example, may improve the contrast of the signage device 250. Background 258 may alternatively be another display or signage device containing one or more luminescent features. For example, using an LCD display as a background 258 may enable the creation of an actively addressed sign with static full color information added by the lightwave coupled signage device 250. The background 258 may alternatively be a colored, textured, transparent, semi-transparent, or opaque material to add special effects to the signage device 250.

Figure 27:
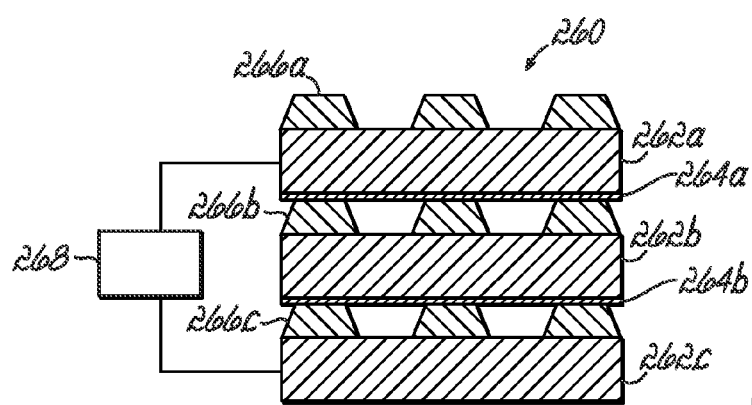
FIG. 27 is a partial cross sectional view showing a multiple-image signage device comprised of multiple thin-sheet waveguides separated by layers of coatings or film that prevent primary light crosstalk.

With reference to FIG. 27, and in accordance with an embodiment of the invention, a signage device 270 includes three stacked thin-sheet waveguides 262a-c with respective photoluminescent features 266a, b, c. A control device 268 may control one or more light sources (not shown) directing light to one or more of the waveguides 262a-c. This embodiment illustrates the adaptability of waveguides of the type described above to produce multiple images by incorporating and stacking multiple thin-sheet waveguides 262a, b, c, as shown. To electro-optically address each waveguide 262a, b, c, an optical barrier 264a consisting of a coating, such as one with reflective properties over a wavelength range of about 380 nm to about 420 nm, or a film sheet, separates waveguides 262a, b while another optical barrier 264b consisting of a coating or film sheet separates waveguides 262b, c. Each of the film sheets contains image pattern luminescent inks 266. Alternatively, an air gap may act as one or more of the optical barriers 264a, b. While signage device 260 is depicted with three thin waveguides 262a, b, c, those of ordinary skill will appreciate that the number of layers of waveguide films is only limited by the ability to inject primary light into them, and by the increasing amount of Fresnel reflection of ambient light added by each additional waveguide. Similarly, those of ordinary skill will appreciate this embodiment may alternatively comprise stacked waveguides similar to waveguide 184 (i.e. not thin).

Figure 28:
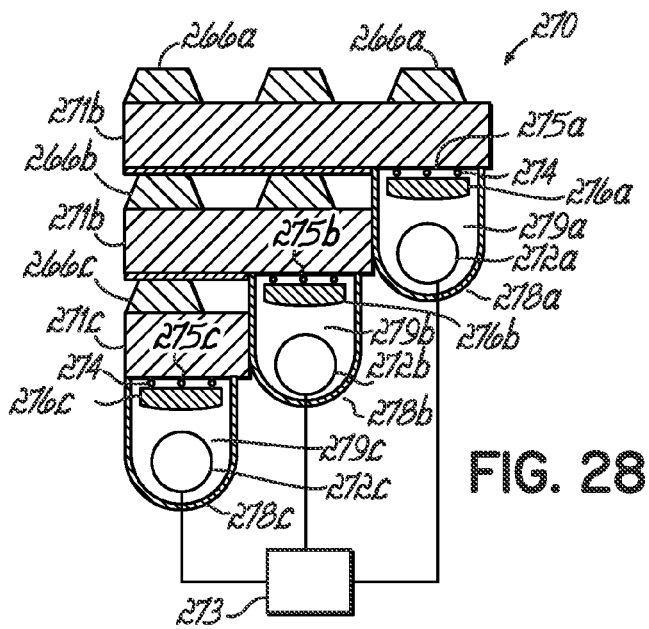
FIG. 28 is a partial cross-sectional view of an arrangement of thin-sheet waveguides incorporating lenses and reflective refractive, diffractive, and reflective surfaces and features.

With reference to FIG. 28, in which like reference numerals refer to like features in FIG. 27 and in accordance with an embodiment of the invention, a signage device 270, is similar to signage device 260 (FIG. 27). The signage device 270 includes three stacked thin sheet waveguides 271a, b, c, each with a respective set of photoluminescent features 266a, b, c and each with a respective light source 272a, b, c. The light sources 272a, b, c of signage device 270 are arranged so as to maximize the quantity of primary light that is directed into the thin sheet waveguides 271a, b, c. The size of each light source 272a, b, c may be relatively large, which contributes to the maximization of the amount of primary light available for the waveguides 271a, b, c. A control device 273 may control one or more of the light sources 272a, b, c directing light into the waveguides 262a, b, c, and may be able to temporally sequence the light from each of the light sources 272a, b, c. Signage device 270 exhibits an enhanced etendue or optical extent. The size of the light sources 272a, b, c and the angle of entry result in an optical constant that cannot be changed by adding reflectors, lenses, or diffractive surfaces in the optical path. In the signage device 270, light may be directed through respective flat edges 275a, b, c and steered by reflective or refractive surfaces or TIR features 274. In one aspect, lenses 276a, b, c and reflectors 278a, b, c surrounding each light source 272a, b, c may be employed to increase collection efficiency. The primary light sources 272a, b, c and the lenses 276a, b, c, if utilized, may be optically or air coupled through selection of a suitable coupling media 279a, b, c. Alternatively, an optical surface grating (not shown) may also be used.

Figure 29:
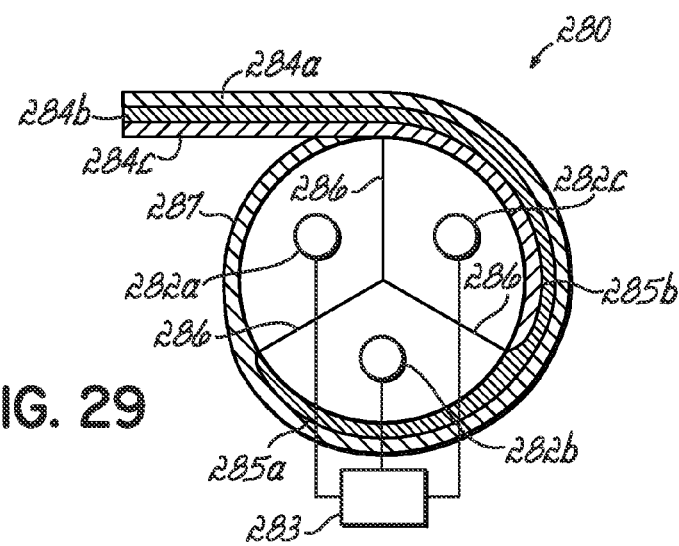
FIG. 29 is a partial cross-sectional view of a signage device showing an alternative spiral-shape approach to injecting light into a multitude of thin-sheet waveguides, each of which can be electro-optically controlled.

With reference to FIG. 29, and in accordance with an embodiment of the invention, a signage device 280 includes coiled tubular waveguides 284a, b, c each receiving light from respective light sources 282a, b, c. The light sources 282a, b, c are centrally located near the origin of a spiral arrangement of waveguides 284a, b, c. Adjacent light sources 282a, b, c are separated by reflective barriers 286a, b, c, respectively, to define a light tube 287 about which the waveguides 284a, b, c are wrapped. The light sources 282a, b, c each feed primary light to one of the waveguides 284a, b, c. Signage device 280 addresses the desirability of maximizing light collection and insertion efficiency and provide a small form factor, by bundling the primary light sources 282a, b, c in a compact package. Each image-dependent light source 282a, b, c may be electro-optically controlled or modulated by a control device 283. Signage device 280 includes a barrier coating or film member 285a between waveguides 284a, b and a barrier coating or film member 285b between waveguides 284b, c to eliminate primary light cross talk. Each of the waveguides 284a, b, c may be tapered, as shown in FIG. 29, in sections proximate each of the respective light sources 282a, b, c. Such tapering may be contingent upon convenience and cost feasibility. The inner surface of the light tube 287 may include an optical coating or film adapted to steer the primary light at a more efficient angle into the waveguides 284a, b, c. An optical film for this purpose may contain, for example, lenticular, Fresnel or diffractive (e.g. blaze) gratings, off-axis refractive elements, or prism films.

Luminescent inks may be selected for forming the photoluminescent features 182 that are very close to either the European Broadcasting Union (EBU) color gamut or the National Television System Committee (NTSC) color gamut, which permits images to be displayed that are equivalent to existing full color (television) monitors. The EBU white point of D65, for example, which corresponds to approximately 6504 Kelvin, may be attained by an appropriate selection of luminescent inks. Similarly, an appropriate selection of luminescent inks may facilitate attainment of full color spectrum images corresponding, for example, to a minimum Maxwell triangle defined by the points (0.3, 0.4), (0.4, 0.3) and (0.3, 0.3) as depicted on a 1931 CIE Chromaticity diagram. Luminescent inks forming part of photoluminescent features 182 may furthermore have transparency levels of at least 50% or greater.

The luminescent inks may be selected to have a high energy conversion efficiency i.e. energy required to produce full color images. Certain luminescent inks may contain high efficiency fluorescent dyes with quantum efficiency above 90%. Exemplary dyes that may meet this requirement include perylene and napthylamide-based dyes. Moreover, the dyes may be incorporated in a pigment that is subsequently incorporated into the ink. The photoluminescent features 182 may also include clear inks, such as ultraviolet curable clear inks as well as inks exhibiting desirable lifetime properties such as those exceeding about 500 hours before reaching a 10% loss of fluorescence intensity. Inks used in the photoluminescent features may further include a white primary color corresponding to a white point temperature of at least about 4500° Kelvin.

The application of the luminescent inks to a waveguide in accordance with the principles of the present invention may be enhanced by a workflow that includes pre-press services and technologies that produce primary color ink spot algorithms. By way of example, a full color image may be color-separated into its primary color constituents using commercially available software programs such as Adobe Photoshop. Conventional technologies cannot produce a Maxwell triangle as produced by the inks that may be used to form the photoluminescent features 182 (FIG. 16). Therefore, unlike such embodiments, conventional technologies cannot generate virtually any color, or any full color image, using a primary color red, green, and blue luminescent ink set. Conventional color print approaches can be modified for luminescent ink use.

Figure 30:
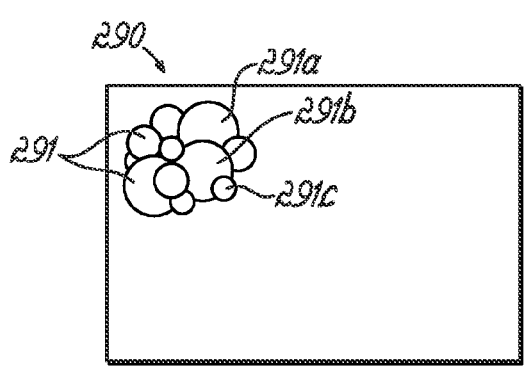
FIG. 30 is a top view of a waveguide depicting inks of different color emission applied to the waveguide in an overlapping pattern.

With reference to FIG. 30, and in accordance with an embodiment of the invention, a waveguide 290 includes photoluminescent features in the form of ink spots 291 applied onto a surface of the waveguide 290. Ink spots 291 may vary in dimensions and in color and are applied with various levels of overlapping between adjacent spots 291. Based on wavelength interference, one skilled in the art may elect to apply the red ink spots 291a first, followed by the green spots 291b, and then the blue spots 291c. This arrangement recognizes that shorter wavelengths emission inks are more transparent than longer wavelength emission inks. However, because red ink may absorb and thereby block some of the primary wavelength light, overlapping the spots 291 may generate black voids in the resulting image. The resulting wavelength of the light emitted by the overlapping pattern of spots 291 on waveguide 290 may be of a primary color selected from a combination of red, green and blue.

Figure 31:
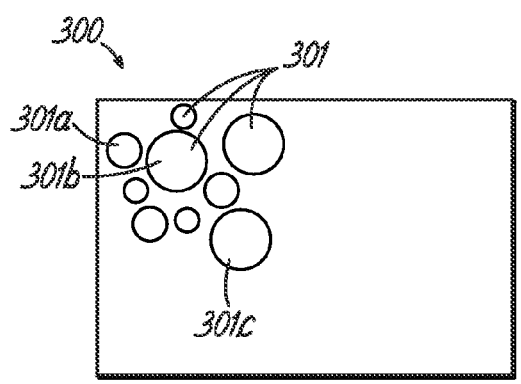
FIG. 31 is a top view of a waveguide depicting inks of different color emission applied to the waveguide in an overlapping pattern.

With reference to FIG. 31, and in accordance with an embodiment of the invention, a waveguide 300, which is similar to waveguide 290 (FIG. 30), includes non-overlapping photoluminescent features in the form of ink spots 301 of different sizes. Such a non-overlapping pattern may optimize color brightness and saturation. This approach, however, may require alignment of the printing process higher in complexity than if the case of overlapping spots 294 (FIG. 30). Alternatively, the non-overlapping ink spots 301 (red spots 301a, green spots 301b, and blue spots 301c) may be of approximately the same size.

The embodiments described above may be further appreciated in light of the following examples.

EXAMPLE 1

A polymer binder (Ferro 75001 polyvinylbutyrolterpolymer PVB, binder) was mixed with about 1 percent to about 10 percent by volume solution of acetone and the maximum soluble concentration of BASF Lumogen 300 and BASF Lumogen 083 fluoropolymers to form a photoluminescent resin. The photoluminescent resin was doctor blade applied to a glass substrate and baked at 150° C. for 10 minutes to volatilize all solvents in order to form a solid gel layer. The photoluminescent layer was then bonded to DuPont KAPTON® tape film and pulled from the glass substrate it was formed on to create a usable film flexible film. The resulting photoluminescent film was placed on an acrylic waveguide propagating blue/violet light from a cold-cathode-fluorescent-lamp.

In regions where pressure was applied onto the photoluminescent layer onto the substrate, the photoluminescent layer brightly fluoresced. The photoluminescent layer was further pressed against the glass in several regions, optically coupling the photoluminescent film to the acrylic waveguide, causing propagating violet/blue light to couple into the photoluminescent film and thereby causing visible fluorescence.

EXAMPLE 2

BASF Lumogen dyes were dissolved at maximum solubility in Acetone. BASF dye Lumogen 570 was used for blue emission, Lumogen 083 for green emission, and Lumogen 300 for red emission. This mixture was then added to and dissolved in acrylic beads in an airtight container. Once the mixture was completely dissolved, a non-volatile thinner of DuPont 8250 was added, mixed, and the acetone allowed to volatize over a period of 12 hours. This photoluminescent resin was then screen-printed onto an acrylic waveguide and baked at 120° C. for 15 minutes to remove the DuPont 8250, forming a hard and transparent photoluminescent layer. The waveguide was then mirrored using an Al adhesive tape and InGaN LEDs attached through apertures in the tape.

This signage form of an LWC display exhibited the following performance:

Waveguide Dimensions: about 2"×4", about 2 mm thickness

Pump Specifications: 10 InGaN violet LEDs, 20 mA each

Power requirement: 3.5 V, 200 mA, 0.7 W

Luminance: red 170 cd/m2 green 440 cd/m2 blue 70 cd/m2

Appearance: Transparent

Color Gamut: Satisfies EBU Gamut

EXAMPLE 3

The photoluminescent resins of Example 2 were screen-printed onto a first acrylic waveguide and baked at 120° C. for 15 minutes to form a hard photoluminescent layer. A second waveguide was then mirrored using an Al adhesive tape and InGaN LEDs attached through apertures in the tape. An silicone oil drop was placed at several regions between the first waveguide and second waveguide, the waveguides then sandwiched together, in order to measure the effective device contrast ratio achievable using electro-static or electrowetting based modulation in an LWC device.

Waveguide Dimensions: about 2"×4", about 2 mm thickness

Pump Specifications: 4 InGaN violet LEDs, 10 mA each

Power requirement: 3.5 V, 40 mA, 0.14 W

|  | Non Coupled | Coupled | Contrast Ratio |
|---|---|---|---|
| red | 0.1 cd/m2 | 50 cd/m2 | 500:1 |
| green | 0.3 cd/m2 | 105 cd/m2 | 300:1 |
| blue | 0.15 cd/m2 | 35 cd/m2 | 200:1 |

Waveguide Luminance: violet 0.1 cd/m2 (at imperfections)

Appearance: Transparent

An interesting comparison may be made to conventional displays. First, for the same optical power density in the waveguide, prior art using a white light waveguide or storage plate would exhibit an approximate luminance of 15-30 cd/m2 due to the strong response of the human eye to white light. This has the effect of reducing the effective contrast in prior art to unacceptable levels of less than 10:1. If a coupler is provided, the above-measured contrast ratio for LWC devices increases by a factor of 10 to 100 by limiting the coupling area between the waveguide and photoluminescent layer to 10 percent to 1 percent of the total LWC device area. This has the effect of increasing the expected contrast of LWC devices and displays to greater than 1,000:1, with 10,000's contrast ratio theoretically achievable.

EXAMPLE 4

Electrowetting LWC device operation was verified in the following manner. 50 nm thick ITO column electrodes were sputter deposited onto a first sheet of Corning 1737 glass. Similarly a 50 nm thick sheet of ITO was sputter deposited onto a second sheet of Corning 1737 glass. About 500 nm of $SiO_2$ dielectric was then further sputter deposited onto the first glass substrate. DuPont TEFLON® AF dissolved in 3M Fluorinert liquid was spin coated onto both glass sheets and baked to a final thickness of about 100 nm. Approximately 1 µL electrolytic water drops (containing KCl) were placed on the first glass glass sheet. Silicone oil doped with BASF Lumogen dyes where then uniformly coated to the second glass sheet. The two sheets were then laminated together with 0.2 mm spacers. The second sheet ITO was grounded and the sheet was edge pumped with a 400 nm LED. The second sheet acted as a waveguide and caused the adjacent oil to fluoresce. The first sheet ITO column electrodes were selectively biased with 40 V, which caused the water droplets to attract to the biased electrodes via electrowetting. The attraction of the water droplet displaced the fluorescent oil effectively 'turning off' the emission in the biased columns. Conversely, columns could be 'turned on' by biasing adjacent columns which attracted away the water droplet, and allowed the oil to rewet the surface of the second sheet and fluoresce.

EXAMPLE 5

Electrostatic LWC devices may be fabricated in the following manner. A Corning 1737 glass substrate of 1.1 mm thickness is used as a fabrication substrate and waveguide. The substrate is then deposited with about 1.5 µm of $MgF_2$ using sputtering, evaporation, or chemical vapor deposition. The $MgF_2$ is patterned on the upper surface of the waveguide using a standard photolithography. The index of refraction of the substrate is 1.54, which results in a critical angle of 65.4° for internal reflection at the substrate/$MgF_2$ interface. Active matrix thin-film poly-Si transistors are deposited onto the patterned $MgF_2$ cladding using plasma-enhanced CVD techniques well known by those skilled in the art. Two (2) µm thick high poly-Si spacers are also deposited on the patterned $MgF_2$ cladding during the poly-Si deposition process. Al lower electrostatic electrodes of 0.1 µm thickness are also sputter deposited onto the $MgF_2$ cladding. A thin organic release layer such as Brewer Science PIRL III is then deposited.

An about 2 µm thick SiON optical coupler with refractive matched to the substrate is also deposited by sputtering and patterned such that it is aligned with the apertures in the cladding. A second organic release layer is deposited onto the substrate using aqueous techniques known by those skilled in the art. The second release layer is patterned such that it does not cover the upper surface of the poly-Si spacers or the SiON coupler. A SiON flexible membrane, which is about 2 µm thick, is then deposited using sputtering. About 0.02 µm thin $In_2O_3$:$SnO_2$ (ITO) upper electrostatic electrode is deposited and patterned onto the upper surface of the SiON flexible membrane. About 10 µm thick photoluminescent layer comprised of PMMA polymer doped with BASF Lumogen fluorescent dye, and containing BaS powder as a slight diffusing material, is then wet deposited and patterned onto the upper electrostatic electrode. Al row, column, power, and ground electrodes of about 0.2 µm thick are deposited, connected to the underlying active matrix circuitry. The electrodes are insulated from each other by a about 1 µm thick silicon dioxide layer. The release layers are then dissolved away leaving a freely standing electrostatic actuation and lightwave coupling structure.

A standard front color filter plate is then aligned and bonded to the lower waveguide/substrate plate. The color filter plate is distanced from the waveguide substrate and adjoining layers by black polymer spacers patterned between the color filters and aligned with the outside edges of each LWC pixel. The substrate/color filter plate is sealed at the edges using a UV curing epoxy, vacuum evacuated, then filled with Argon gas to a pressure of 100 Torr. Alternatively the environment between the plates may be filled with a low viscosity (~1 cts) low index (~1.3) fluid.

Mirrored structures are attached and optically bonded to all four edges of the waveguide plate. The mirrored structures consist of multilayer dielectric/metal reflectors conventionally known by those skilled in the art such that greater than 99 percent of incident visible light of about 400 nm is reflected. Lensed and horizontally emitting violet LED's are then inserted into vertical holes drilled near the edges of the waveguide. The LED's emit within a horizontal degree of 20 degrees, which results in a maximum angle of incidence in the waveguide of 77 degrees, which is more than 10 degrees within the critical angle requirement. The rear surface of the display is then painted with black paint onto the rear $MgF_2$ 'cladding.

The paint acts as a light absorbing layer to decrease ambient reflection. A circular polarizing filter is then laminated onto the front of the color-filter plate. The rear of the display is then properly enclosed and packaged, including required driver circuitry, electrical connections, and mounting fixtures for the LWC flat panel display. Assuming use of InGaN LED's producing a phosphor converted white efficiency of 80 lm/W, the peak theoretical efficiency of the display described here is greater than 40 lm/W. A reasonable luminance level for the display of 50 to 5000 cd/m2 is expected due to the high luminous efficiency. The display inherently exhibits a specular reflection of 2 percent and a diffuse reflection of 1 percent allowing sunlight legibility.

EXAMPLE 6

Full color pictures of people and commercial products were photographed with a Canon Digital Rebel camera using 6.3 mega-pixels, large jpeg format. These RGB images were converted utilizing a professional pre-press company to silk screens compatible with the overlapping color spot printing format. The silk screen printing was carried out on Lucite UTRAN, a continuous cast acrylic sheet with low haze, absence of UV absorbers and whiteners, and high transmission above about 390 nm. The luminescent inks were formulated by incorporating perlyene or napthalamide-based fluorescent dyes into clear solvent or UV-curable based. The resulting ink is transparent to wavelengths greater than about 380 nm. Numerous commercial fluorescent pigments (Dayglo, Nichia, Firefly, etc.) were also evaluated and found to be inferior to the transparency (>80%), quantum efficiency (>85%), and pure red, green, blue, white luminescent color saturation produced by the custom-formulated inks of the present invention. The process saw the red ink printed first followed by the green and then the blue. Once the lightguide was processed, it was assembled into a sign using a CCFL lamp with Nichia phosphor that emitted light near about 400 nm. The lamp and opposite edges of the lightguide were wrapped in reflective mirrored plastic. The resulting panel achieved >50 cd/m2 average luminance, peak luminance values >500 cd/m2. The resulting panel was invisible (clear) when turned 'off'. The images shown on the panel, which comprised a full color, fully transparent luminescent ink sign, achieved accurate levels of white points, skin tones, and other hues that could not be achieved if conventional light sources and fluorescent pigments where utilized.

EXAMPLE 7

The images for a double image, color, fully transparent sign were a combination of line-art graphics and a corporate logo. Two acrylic lightguides were silkscreen printed using the process above where each lightguide had text and logo design images in solid, preset colors. The two lightguides were assembled with CCFL, mirrored plastic reflectors. Finally, the two lightguides were assembled into a single frame in such a way as the images were superimposed. An electrical control switch was used to alternate powering each sign so that the sign sequentially moved from being totally transparent, to having only the first lightguide illuminated, to having only the second lightguide illuminated, and returning to the transparent, off, state.

EXAMPLE 8

A single image, color, fully transparent sign was built as in Example 6 with the exception that the lightguide was comprised of a ⅛ inch thick PMMA sheet with a clear poly vinyl chloride (PVC) cling sheet coupled to it and containing the luminescent inks. The inks were applied by inkjet printing whereby the image was stored and processed in a personal computer. Conventional print drivers were used to pre-process the image before printing. Optimization of these drivers for the exact properties of the luminescent inks would have improved the color correctness of the final sign.

EXAMPLE 9

A lightguide was fabricated as in Example 7 and installed into a commercially available cell phone in place of the LCD display. The LED light sources were replaced with similar LED's, but ones designed to emit light at about 390 nm wavelength. The cell phone was then reassembled. When the phone was activated, the display showed a full color static image that was considerably brighter than the LCD display it replaced.

EXAMPLE 10

A proposed design was presented to marketing executives whereby the windshield of a car sitting in a showroom could be transformed into an active, full color signage application. In this case, the windshield of the car would be used as a component of the lightguide, with a thin cling PVC film containing the luminescent ink images coupled to the surface. A portable light source of about 390 to about 420 nm, powered through a 12 volt power port (formerly the cigarette lighter), would be coupled to the inside of the windshield actively illuminating the bright, full color images. Standard print material could also be employed on the inside of the windshield in such a way that the illuminated images/text could add information and build in special color effects. When the sign would be turned off, the windshield would be transparent allowing the potential customer to view through the windshield normally. This same product concept could be incorporated into a storefront window or point-of-sale display case.

EXAMPLE 11

A static image, flexible transparent sign was built as in Example 6 with the exception that the lightguide was comprised of a 1/32 inch flexible sheet containing PMMA and other polymers that improve flexibility. Violet light was surface-coupled to the flexible sheet using surface emitting LEDs and a diffuse reflector painted onto the side of the sheet opposite the LEDs.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A signage device comprising:
   a waveguide adapted to propagate light of a first wavelength shorter than about 450 nm; and
   at least one photoluminescent feature coupled with the waveguide for receiving the light of the first wavelength, the at least one photoluminescent feature adapted to emit light of a second wavelength between about 420 nm and about 650 nm in response to receiving the light of the first wavelength, wherein the at least one photoluminescent feature further comprises a primary color luminescent ink having an optical transparency of about 50% or greater.

2. The signage device of claim 1 wherein the waveguide includes a reflective surface operating to reduce loss of the light of the first wavelength by reflection.

3. The signage device of claim 2 wherein the reflective surface includes a surface finish capable of enhancing retention of the light of the first wavelength within the waveguide by total internal reflection (TIR).

4. The signage device of claim 2 wherein the waveguide has a major dimension such that a number of reflections of the light of the first wavelength along the major dimension is at least one.

5. The signage device of claim 1 further comprising:
a light source adapted to emit the light of the first wavelength; and
a reflective surface arranged relative to the light source so as to direct the light of the first wavelength into the waveguide.

6. The signage device of claim 5 wherein the reflective surface has a primarily parabolic geometrical shape or a primarily elliptical geometrical shape.

7. The signage device of claim 5 further comprising:
an optical element disposed between the waveguide and the light source.

8. The signage device of claim 1 wherein the waveguide is composed of a material that is substantially free of substances absorptive of light in a wavelength band between about 350 nm and about 420 nm.

9. The signage device of claim 1 wherein the waveguide further comprises a thin, flexible substrate carrying the at least one photoluminescent feature.

10. The signage device of claim 9 wherein the thin, flexible substrate is configured to adhere to a thicker substrate.

11. The signage device of claim 1 further comprising:
a plurality of light sources adapted to emit the light of the first wavelength, each of the light sources coupled with the waveguide.

12. The signage device of claim 11 further comprising a plurality of photoluminescent features, wherein the light sources may be operated to temporally sequence the light of the first wavelength for coupling with different photoluminescent features to create multiple images.

13. The signage device of claim 1 further comprising:
an antireflective coating on the at least one photoluminescent feature and the waveguide.

14. The signage device of claim 1 further comprising:
a scratch-resistant coating on the at least one photoluminescent feature and the waveguide.

15. The signage device of claim 1 further comprising:
a background layer arranged relative to said waveguide, the background layer carrying a feature visible to a viewer through the waveguide.

16. The signage device of claim 1 wherein the at least one photoluminescent feature comprises an acrylic host medium, light stable fluorescent particles in the acrylic host medium, and ultra-violet stabilizer additives in the acrylic host medium.

17. A signage device comprising:
a waveguide adapted to propagate light of a first wavelength shorter than about 450 nm; and
at least one photoluminescent feature coupled with the waveguide for receiving the light of the first wavelength, the at least one photoluminescent feature adapted to emit light of a second wavelength between about 420 nm and about 650 nm in response to receiving the light of the first wavelength, wherein the at least one photoluminescent feature comprises an ultraviolet curable clear ink.

18. The signage device of claim 17 wherein the at least one photoluminescent feature comprises an ink with a lifetime exceeding about 500 hours before exhibiting a fluorescence intensity loss of about 10% or greater.

19. The signage device of claim 1 further comprising:
a plurality of photoluminescent features each including one of a plurality of primary-color luminescent inks capable of creating full color spectrum images corresponding to a minimum Maxwell triangle of (0.3, 0.4) (0.4, 0.3) (0.3, 0.3) as depicted on a 1931 CIE Chromaticity diagram.

20. The signage device of claim 1 wherein the at least one photoluminescent feature comprises a white primary-color luminescent ink corresponding to a white point temperature of at least 4500 Kelvin.

21. The signage device of claim 1 wherein the at least one photoluminescent feature comprises a luminescent ink of internal quantum optical efficiency of about 80% or more for light of the first wavelength and in a wavelength band between about 350 nm and about 420 nm.

22. The signage device of claim 1 whereby the waveguide has a luminance non-uniformity less than about 0.5.

23. The signage device of claim 1 further comprising a plurality of photoluminescent features applied to the waveguide in a predominantly overlapping pattern.

24. The signage device of claim 23 wherein the second wavelength of each of the photoluminescent features is a primary color selected from the group consisting of red, green, and blue.

25. The signage device of claim 24 wherein the red photoluminescent features are between the green photoluminescent features and the waveguide, and the green photoluminescent features are between the blue photoluminescent features and the waveguide.

26. The signage device of claim 1 further comprising:
a plurality of photoluminescent features applied to the waveguide in a predominantly non-overlapping pattern.

27. The signage device of claim 1 wherein the photoluminescent features have different sizes.

28. The signage device of claim 1 wherein the waveguide includes a lenticular surface or a prismatic surface adapted to steer the light of the second wavelength from the at least one photoluminescent feature to a viewer.

29. The signage device of claim 1 further comprising:
a light source emitting the light at the first wavelength within a wavelength band between about 380 nm and about 420 nm.

30. The signage device of claim 1 further comprising:
a light source coupled with the waveguide, the light source selected from the group consisting of a fluorescent tube, a light emitting diode, a solid-state laser, and a remotely directed arc lamp.

31. The signage device of claim 1 further comprising:
a light source coupled with the waveguide, the light source at least partially comprising a substance that emits the light of the first wavelength primarily within a wavelength band between about 380 nm and about 420 nm.

32. The signage device of claim 1 further comprising:
a light source coupled with the waveguide, the light source adapted to inject the light of the first wavelength into the waveguide.

33. The signage device of claim 32 further comprising:
a control device for controlling a property of the light source.

34. The signage device of claim 32 wherein the light source is adapted to be powered by a wireless technique.

35. The signage device of claim 32 wherein the light source includes one or more reflective surfaces or refractive surfaces for controlling an entry angle of the light of the first wavelength into the waveguide.

36. The signage device of claim 32 further comprising:
a coupling element coupling the light source with the waveguide, the waveguide and the coupling element having approximately equal indices of refraction.

37. The signage device of claim 32 wherein the light source is physically embedded within the waveguide.

38. The signage device of claim 37 wherein the waveguide has a peripheral edge, and further comprising:
a reflective film or a polished surface disposed about the peripheral edge.

39. The signage device of claim 1 wherein the light source is portable, and the waveguide comprises a part of an existing structure.

40. The signage device of claim 1 wherein the at least one photoluminescent feature is optically coupled with the waveguide.

41. A display comprising:
a plurality of the signage devices of claim 1 having a two dimensional arrangement or a three dimensional arrangement; and
a plurality of light sources adapted to emit the light of the first wavelength, each of the light sources coupled with a respective one of the signage devices.

42. A signage device comprising:
a plurality of waveguides each adapted to propagate light of a first wavelength shorter than about 450 nm, the waveguides arranged with an overlapping relationship; and
at least one photoluminescent feature coupled with each of the waveguides for receiving the light of the first wavelength, the at least one photoluminescent feature adapted to emit light of a second wavelength between about 420 nm and about 650 nm in response to receiving the light of the first wavelength, and the light of the second wavelength emitted from the at least one photoluminescent feature of at least one of the waveguides being transmitted to a viewer through at least another of the waveguides.

43. The signage device of claim 42 where adjacent pairs of the waveguides are separated by at least one of an optical barrier film or a coating such that multiple images can be created and electro-optically controlled.

44. The signage device of claim 42 further comprising:
means for maximizing collection efficiency and entrance angle of the light of the first wavelength into the waveguides.

45. The signage device of claim 44 wherein the means comprises one or more lenses.

46. The signage device of claim 42 further comprising:
a columnar light source adapted to emit the light of the first wavelength, the waveguides being wrapped about the columnar light source such that each of the waveguides independently receives a portion of the light of the first wavelength.

47. The signage device of claim 46 further comprising:
at least one optical element on the columnar light source to steer the light of the first wavelength into the waveguides.

48. The signage device of claim 42 further comprising:
a plurality of light sources adapted to emit the light of the first wavelength, each of the light sources optically coupled with a respective one of the waveguides.

49. The signage device of claim 48 further comprising:
a control for operating the light sources to temporally sequence the light of the first wavelength from each of the light sources for optically coupling with the photoluminescent features on different waveguides to create multiple images.

* * * * *

UNITED STATES PATENT AND TRADEMARK OFFICE
CERTIFICATE OF CORRECTION

PATENT NO. : 7,430,355 B2
APPLICATION NO. : 11/535801
DATED : September 30, 2008
INVENTOR(S) : Jason C. Heikenfeld et al.

It is certified that error appears in the above-identified patent and that said Letters Patent is hereby corrected as shown below:

In column 1, line 54, before "specular", delete "a".

In column 2, page 2, change "microfuidics" to --microfluidics--.

In column 3:
Line 19, after "way", insert --of--.
Line 54, before "lightwave", delete "modulated".

In column 5, line 17, change "Si3N4" to --$Si_3N_4$--.

In column 6:
Line 21, change "In2O3:SnO2" to --$In_2O_3:SnO_2$--.
Line 64, change "(SiO2), Si3N4," to --($SiO_2$), $Si_3N_4$,--.

In column 7:
Line 16, change "SiO2, or Si3N4" to --$SiO_2$, or $Si_3N_4$--.
Line 20, change "include" to --including--.
Line 62, change "Y2O3:Eu" to --$Y_2O_3$:Eu--.

In column 8:
Line 29, change "TiO2" to --$TiO_2$--.
Line 37, change "SiO2/TiO2" to --$SiO_2/TiO_2$--.
Line 66, change "complimentary" to --complementary--.

In column 10, line 25, after "appropriate." delete "with".

In column 11:
Line 30, change "refection" to --reflection--.
Line 46, change "TiO2, SiO2" to --$TiO_2$, $SiO_2$--.
Line 48, change "VikuitiTM" to --Vikuiti™--.
Line 49, change "sources" to --source--.

In column 13, line 55, change "MgF2" to --$MgF_2$--.

In column 16:
Line 4, change "limited, to" to --limited to,--.
Line 11, after "may" insert --be--.

In column 17, line 30, change "with" to --that--.

UNITED STATES PATENT AND TRADEMARK OFFICE
CERTIFICATE OF CORRECTION

PATENT NO.         : 7,430,355 B2
APPLICATION NO.    : 11/535801
DATED              : September 30, 2008
INVENTOR(S)        : Jason C. Heikenfeld et al.

It is certified that error appears in the above-identified patent and that said Letters Patent is hereby corrected as shown below:

In column 18, line 32, after "from", delete "of".

In column 19, line 65, change "by" to --but--.

In column 21:
Line 3, change "BaTiO3" to --BaTiO$_3$--.
Line 28, change "reflects" to --reflect--.

In column 22:
Line 5, change "hence," to --hence--.
Line 42, change "acts a" to --act as a--.
Line 43, after "according", insert --to--.
Line 60, after "area", insert --of--.

In column 23:
Line 15, change "indicted" to --indicated--.
Line 45, change "though" to --through--.

In column 24:
Line 2, change "may used to affect" to --may be used to effect--.
Line 11, change "non selected" to --nonselected--.

In column 25, line 64, change "Coming" to --Corning--.

In column 28, line 57, change "FIGS." to --FIG.--.

In column 29, line 5, change "activate" to --activates--.

In column 32:
Line 15, after "270", delete ",".
Line 55, change "provide" to --provides--.

In column 35:
Line 7, change "An" to --A--.
Line 51, change "SiO2" to --SiO$_2$--.
Line 56, after "glass", delete "glass".
Line 57, change "where" to --were--.

UNITED STATES PATENT AND TRADEMARK OFFICE
CERTIFICATE OF CORRECTION

PATENT NO. : 7,430,355 B2
APPLICATION NO. : 11/535801
DATED : September 30, 2008
INVENTOR(S) : Jason C. Heikenfeld et al.

It is certified that error appears in the above-identified patent and that said Letters Patent is hereby corrected as shown below:

In column 36:
Lines 9, 11, 19, 21 and 67, change "MgF2" to --$MgF_2$--.
Line 24, after "refractive", insert --index--.
Line 33, change "In2O3:SnO2" to --$In_2O_3:SnO_2$--.

Signed and Sealed this

Eighteenth Day of August, 2009

David J. Kappos
*Director of the United States Patent and Trademark Office*